(12) United States Patent
Reynolds

(10) Patent No.: US 6,781,418 B1
(45) Date of Patent: Aug. 24, 2004

(54) ARBITER/PULSE DISCRIMINATOR CIRCUITS WITH IMPROVED METASTABLE FAILURE RATE BY DELAYED BALANCE POINT ADJUSTMENT

(75) Inventor: Grahame K. Reynolds, Southampton (GB)

(73) Assignee: Cypress Semiconductor Corp., San Jose, CA (US)

( * ) Notice: Subject to any disclaimer, the term of this patent is extended or adjusted under 35 U.S.C. 154(b) by 485 days.

(21) Appl. No.: 09/960,596

(22) Filed: Sep. 21, 2001

(51) Int. Cl.[7] ............................................. H03K 19/00
(52) U.S. Cl. ........................... 326/94; 327/19; 327/199
(58) Field of Search ............................... 710/240, 244; 326/94, 37, 38, 46, 93; 327/19, 18, 198, 199

(56) References Cited

U.S. PATENT DOCUMENTS

| | | | |
|---|---|---|---|
| 4,398,105 A | 8/1983 | Keller | 307/518 |
| 4,403,192 A | 9/1983 | Williman | 328/152 |
| 4,924,220 A | 5/1990 | Mihara et al. | 340/825.51 |
| 4,998,030 A | 3/1991 | Cates | 307/518 |
| 6,188,249 B1 | 2/2001 | Becker | 327/19 |
| 6,498,513 B1 * | 12/2002 | Reynolds | 326/94 |
| 6,674,306 B1 * | 1/2004 | Reynolds | 326/94 |
| 6,690,203 B2 * | 2/2004 | Nystrom et al. | 326/94 |

OTHER PUBLICATIONS

Grahame K. Reynolds, "Metastability Recovery Circuit", U.S. Ser. No. 09/877,657, Filed Jun. 7, 2001.
Grahame K. Reynolds, "Method and Apparatus for the Use of Discriminators for Priority Arbitration", U.S. Ser. No. 09/877,659, Filed Jun. 7, 2001.
Grahame K. Reynolds, "Multiport Arbitration Using Phased Locking Arbiters", U.S. Ser. No. 09/877,660, Filed Jun. 7, 2001.
Grahame K. Reynolds, "Discriminator Circuit", U.S. Ser. No. 09/877,658, Filed Jun. 7, 2001.

* cited by examiner

*Primary Examiner*—Don Le
(74) *Attorney, Agent, or Firm*—Christopher P. Maiorana, P.C.

(57) ABSTRACT

An apparatus comprising a first circuit and a second circuit. The first circuit may be configured to arbitrate a plurality of input request signals and present one or more first control signals. The second circuit may be configured to control the arbitration in response to an adjustable balance point of the input request signals, where the balance point is adjusted to reduce a metastable state of the first circuit.

20 Claims, 16 Drawing Sheets

US 6,781,418 B1

ARBITER/PULSE DISCRIMINATOR CIRCUITS WITH IMPROVED METASTABLE FAILURE RATE BY DELAYED BALANCE POINT ADJUSTMENT

CROSS REFERENCE TO RELATED APPLICATIONS

The present application may relate to co-pending applications Ser. No. 09/877,657, filed Jun. 7, 2001, Ser. No. 09/877,658, filed Jun. 7, 2001, Ser. No. 09/877,659, filed Jun. 7, 2001 and Ser. No. 09/877,660, filed Jun. 7, 2001, which are each hereby incorporated by reference in their entirety.

FIELD OF THE INVENTION

The present invention relates to a method and/or architecture for arbiter circuits generally and, more particularly, to an arbiter with a metastable failure rate improved by delayed balance point adjustment.

BACKGROUND OF THE INVENTION

Arbitration circuitry (i.e., an arbiter) can be implemented to choose the signal that will be given control of a bus (or other resource) when two or more signals are in contention for control of the bus (i.e., identical memory requests within the same memory cycle).

Referring to FIG. 1, a block diagram of a circuit 10 illustrating a conventional arbiter is shown. The circuit 10 includes a NAND gate 12 cross-coupled to a NAND gate 14 (i.e., the output of the gate 12 is coupled to an input to the gate 14 and an output of the gate 14 is coupled to an input to the gate 12). A second input of the gate 12 receives a request signal REQX and a second input of the gate 14 receives a request signal REQY. The signals REQX and REQY can be in contention. The gate 12 generates a grant signal GRANTX_B which is presented by the arbiter 10 when the signal REQX is chosen (i.e., given priority by the arbiter 10). The gate 14 generates a grant signal GRANTY_B which is presented by the arbiter 10 when the signal REQY is chosen.

However, arbitration using the cross-coupled NAND arbiter circuit 10 can cause excessive delays due to metastable events (i.e., when the signals GRANTX_B and GRANTY_B are between a digital HIGH ("on" or 1) or a LOW ("off" or 0) state). The circuit 10 is subject to metastability when the inputs REQX and REQY change states simultaneously. Furthermore, resolution time of cross-coupled arbiters such as the circuit 10 is not predictable.

Referring to FIG. 2, a timing diagram 20 illustrating a resolution time aperture window of the circuit 10 is shown. The X axis represents the phase difference between REQX and REQY. The Y axis represents the resolution time of the arbiter 10. When the signals REQX and REQY transition from LOW to HIGH simultaneously there is a resolution time Tr at which the signals GRANTX_B and GRANTY_B can be metastable. The metastable state of duration Tr or greater occurs between a REQX/REQY phase difference 22 and a REQX/REQY phase difference 24 (i.e., an aperture, in some cases 3 ps). When the phase of the signals REQX and REQY lie between the phase differences 22 and 24 the signals GRANTX_B and GRANTY_B are erroneous. The failure rate of the circuit 10 depends on the width of the metastable aperture window. The resolution time Tr is a critical failure time.

Referring to FIG. 3, a timing diagram 30 of the circuit 10 is shown. The signals GRANTX_B and GRANTY_B are shown crossing between a time 32 and a time 34. The period between the time 32 and the time 34 illustrates the metastable event. The level VM is the balance point between stable and metastable operation for the circuit 10 (i.e., the signals GRANTX_B and GRANTY_B).

Referring to FIG. 4, a block diagram of a circuit 40 illustrating a discriminator arbiter is shown. The circuit 40 includes inverter 42 and 52, delay circuits 44 and 46, a NOR gate 48, a latch/discriminator circuit 50, and a NAND gate 54. The delay circuit 44 provides a delay for the settling time of the circuit 40. The delay 46 provides a delay to match the circuit 40 propagation times for the signals REQX and REQY. The circuit 40 is in a metastable state when the signals GRANTX_B and GRANTY_B balance. The circuit 40 operates similarly to the circuit 10.

Referring to FIG. 5, a detailed block diagram of the circuit 50 of FIG. 4 is shown. The circuit 50 can be a jamb latch circuit. The circuit 50 includes a discriminator circuit 60, a latch circuit 62, a device 64, a device 66, a device 68 and a device 70. The devices 64 and 66 are inverting amplifiers (i.e., inverters). The device 64 has an input coupled to the output of the device 66 and an output coupled to the input of the device 66. When the circuit 50 is implemented using circuit 60 and without the circuit 62, the circuit 50 may act as an asynchronous jamb latch. When the circuit 50 is implemented using the circuit 62 and without the circuit 60, the circuit 50 may act as a synchronous jamb latch. When the signals A and B balance, the circuit 50 can be metastable.

Pulse discrimination using the jamb latch 50 as a pulse discriminator with an arbiter circuit 40 can cause excessive delays due to metastable events similarly to the circuit 10 (i.e., when the circuit 50 is metastable). Resolution time of the discriminator arbiter circuit 40 is not predictable. The failure rate of the discriminator arbiter circuit 40 can depend on the width of the metastable aperture window similarly to the circuit 10.

It would be desirable to have an arbiter and/or discriminator that has a narrow metastable aperture, has a high MTBF, and reduces the effects of metastable conditions.

SUMMARY OF THE INVENTION

The present invention concerns an apparatus comprising a first circuit and a second circuit. The first circuit may be configured to arbitrate a plurality of input request signals and present one or more first control signals. The second circuit may be configured to control the arbitration in response to an adjustable balance point of the input request signals, where the balance point is adjusted to reduce the duration of a metastable state of the first circuit.

The objects, features and advantages of the present invention include providing an arbiter with an improved metastable failure rate by delayed balance point adjustment that may (i) reduce an arbiter aperture, (ii) increase mean time between failures, (iii) reduce arbiter delays associated with metastable events, (iv) be used in multi-port memories, (v) effect arbitration between two (or more) asynchronous requests, (vi) reduce the probability of arbiter errors, (vii) reduce the effects of metastable conditions, (viii) have delayed contention, (ix) have one or more adjustable delays, and/or (x) control resolution time.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 6:
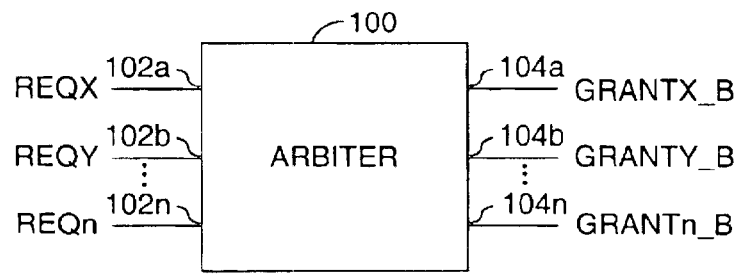
FIG. 6 is a block diagram of a preferred embodiment of the present invention.

Referring to FIG. 6, a block diagram illustrating a circuit 100 is shown in accordance with a preferred embodiment of the present invention. The circuit 100 may have a plurality of inputs 102a–102n that may receive a plurality of signals (e.g., REQX REQY, . . . , REQn) and a plurality of outputs 104a–104n that may present a plurality of signals (e.g., GRANTX_B, GRANTY_B, . . . , GRANTn_B)). In one example, the signals REQX–REQn may be implemented as bus request input signals and the signals GRANTX_B–GRANTn_B may be implemented as bus control (or grant) output signals. However, the circuit 100 may arbitrate other resources (e.g., disk access, etc.) accordingly to meet the design criteria of a particular application. While generally shown in connection with two input signals REQX and REQY and two output signals GRANTX_B and GRANTY_B, the circuit 100 may be configured to arbitrate (or prioritize) any appropriate number of input and output signals accordingly to meet the design criteria of a particular application (e.g., dual-port memories, quad-port memories, etc.). The circuit 100 may be implemented as an arbiter with an improved metastable failure rate by delayed balance point adjustment and/or delayed contention. The circuit 100 may implement a balance point adjustment after an adjustable delay to control arbitration resolution time.

The circuit 100 may be implemented as an arbiter circuit and one or more contending circuits implemented with a lower p-channel width device to n-channel width device ratio than the arbiter circuit. When progressive stages of the contending circuits are turned on, the balance point of the arbiter in the circuit 100 may be adjusted progressively further in a given direction. In one example, the circuit 100 may implement a metastable look-ahead circuit to detect close proximity of input events to control the assertion of a state of the arbiter.

Figure 7:
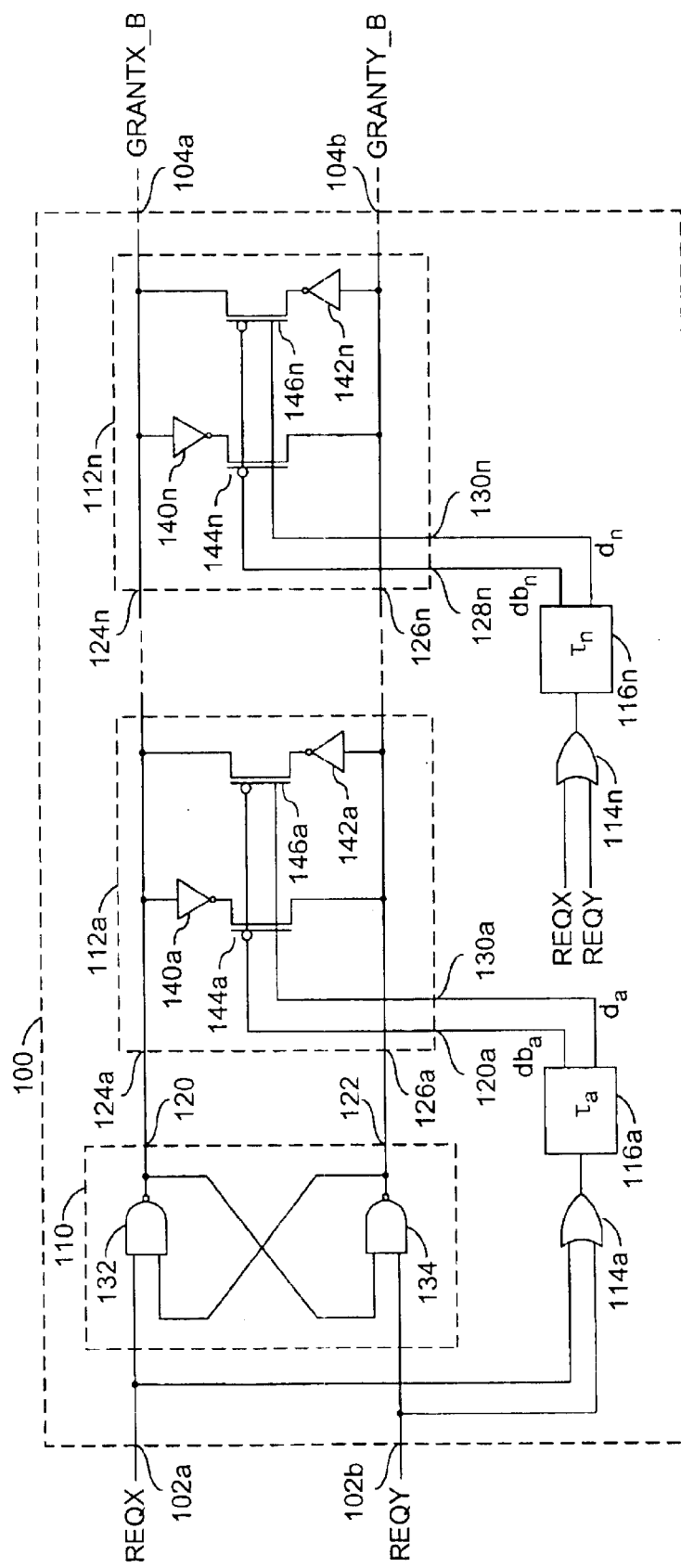
FIG. 7 is a detailed block diagram of an embodiment of the circuit of FIG. 6.

Referring to FIG. 7, a detailed block diagram illustrating a first embodiment of the circuit 100 is shown. In one example, the circuit 100 may comprise a circuit 110, one or more circuits 112a–112n, one or more devices 114a–114n, and one or more circuit 116a–116n. The circuit 110 may be implemented as a cross-coupled NAND gate arbiter circuit. The circuits 112a–112n may be implemented as latching circuits. The devices 114a–114n may be implemented as logical gates. The circuits 116a–116n may be implemented as delay circuits. The circuit 110 may have a first input that may receive the signal REQX, a second input that may receive the signal REQY, an output 120 that may present the signal GRANTX_B, and an output 122 that may present the signal GRANTY_B.

Each of the circuits 112a–112n may have an input 124a–124n that may receive the signal GRANTX_B, an input 126a–126n that may receive the signal GRANTY_B, an input 128a–128n that may receive a signal (e.g., DBa–DBn), an input 130a–130n that may receive a signal (e.g., Da–Dn), a first output that may present the signal GRANTX_B, and a second output that may present the signal GRANTY_B. The signal D may be implemented as a delayed timing control signal. The signal DB may be the digital complement (e.g., inverse) of the signal D. When the circuit 100 is implemented using two or more of the circuits 112, the circuits 112 may be serially connected (e.g., the first output of the circuit 112a may be connected to the input 124b and the second output of the circuit 112a may be connected to the input 126b, . . . , and the first output of the circuit 112(n−1) may be connected to the input 124n and the second output of the circuit 112n(n−1) may be connected to the input 126n).

Each of the devices 114a–114n may have a first input that may receive the signal REQX, a second input that may receive the signal REQY, and an output that may be coupled to an input of the circuits 116a–116n, respectively. In one example, the circuit 114 may be implemented as a logical OR gate. However, other logical gates and/or circuits may be implemented accordingly to meet the design criteria of a particular application.

Each of the circuits 116a–116n may have a first output that may present the signal DBa–DBn and a second output that may present the signal Da–Dn, respectively. The circuits 116a–116n may be implemented as delay circuits (or elements) providing a time delay τa–τn, respectively. The time delays τa–τn may be implemented as the same or different time delays. In one example, the delays τa–τn may be progressively longer delays. The circuits 116a–116n may be configured to generate the time delayed clock signals Da–Dn and DBa–DBn in response to the signals REQX and REQY and the time delays τa–τn. A total time delay τ (e.g., the sum of delays τa–τn) may be adjustable (e.g., one or more of the circuits 112, 114 and 116 may be implemented and/or turned on).

The circuit 110 may comprise a device 132 and a device 134. The devices 132 and 134 may be implemented as NAND gates. The circuit 110 may be implemented as a cross-coupled NAND gate arbiter circuit similarly to the circuit 10.

The circuit 112 may comprise a device 140, a device 142, a device 144, and a device 146. The devices 140 and 142 may be implemented as inverting amplifiers (e.g., inverters). The devices 144 and 146 may be implemented as pass gates. However, other appropriate coupling devices may be implemented to meet the design criteria of a particular application.

Figure 1:
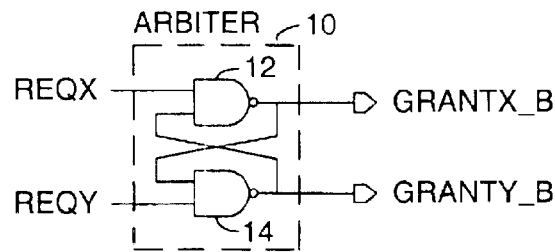
FIG. 1 is a block diagram of a cross-coupled NAND gate arbiter circuit.
Figure 2:
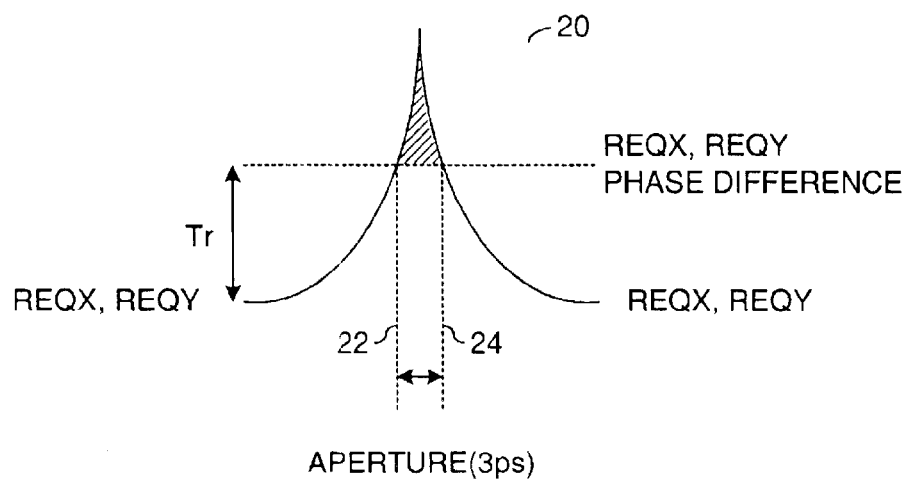
FIG. 2 is a timing diagram of an aperture window of the arbiter of FIG. 1.
Figure 3:
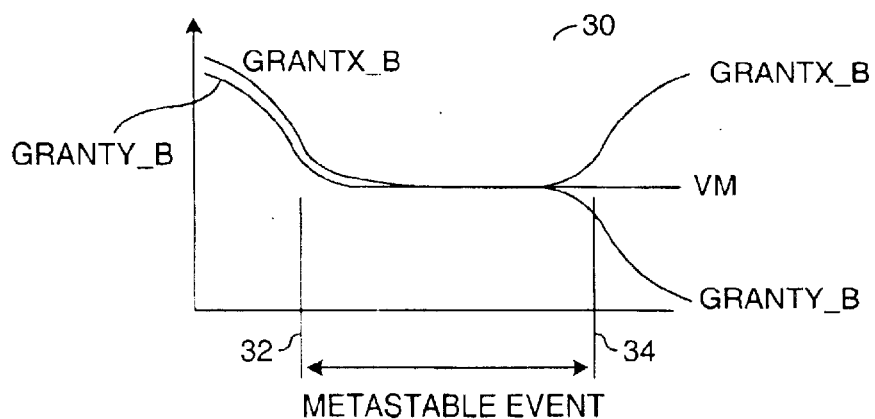
FIG. 3 is another timing diagram of the arbiter of FIG. 1.
Figure 4:
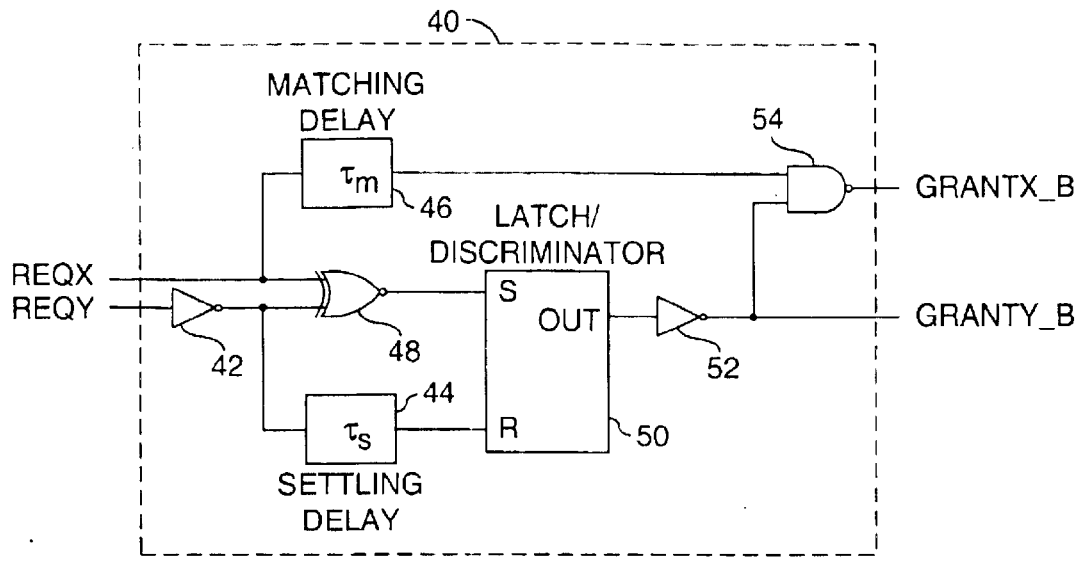
FIG. 4 is a block diagram of a discriminator arbiter circuit.
Figure 5:
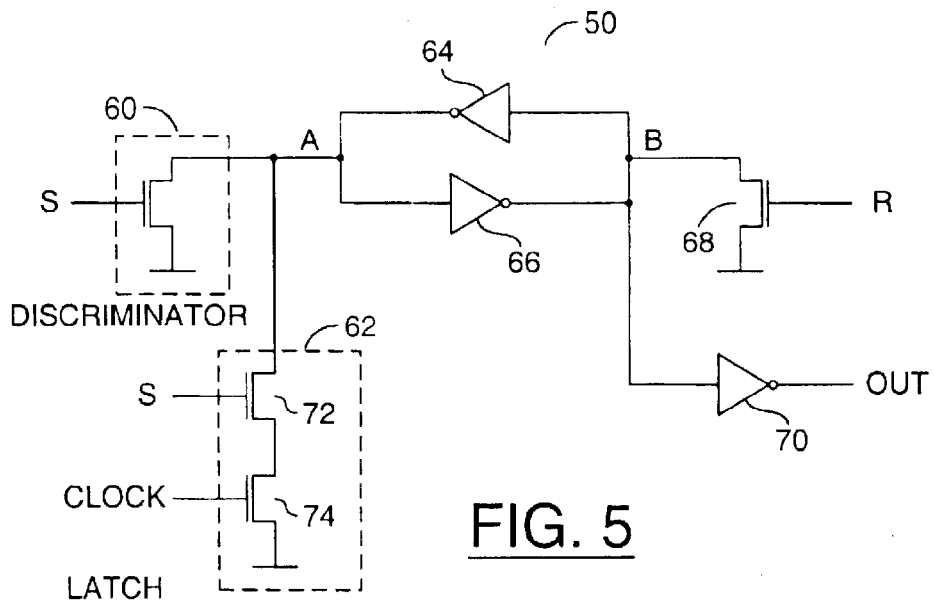
FIG. 5 is a block diagram of a latch/discriminator circuit of FIG. 4.

The device 140 may have an input that may receive the signal GRANTX_B and an output that may be coupled to a first source/drain of the device 144. The device 142 may have an input that may receive the signal GRANTY_B and an output that may be coupled to a first source/drain of the device 146. The device 144 may have a second source/drain that may receive the signal GRANTY_B, an inverting gate that may receive the signal DB, and a non-inverting gate that may receive the signal D. The device 146 may have a second source/drain that may receive the signal GRANTX_B, an inverting gate that may receive the signal DB, and a non-inverting gate that may receive the signal D. The devices 140 and 142 may be configured as a jamb latch circuit similarly to the devices 64 and 66 of FIG. 5. The circuit 112 may be controlled (e.g., turned on or turned off) in response to the signals D and DB. The circuits 112a–112n may be configured to adjust the balance point of the circuit 100 after the delays τa–τn, respectively. When the circuits 112a–112n are progressively turned on, the balance point of the circuit 100 may be progressively adjusted in a given direction.

A parameter z for a device may be defined as the effective width of the p-channels in the device divided by the effective width of the n-channels in the device. The devices 132 and 134 generally have equal z values (e.g., z1). The devices 140 and 142 generally have equal z values (e.g., z2). The devices 132 and 134 may be configured such that z1 is generally higher than z2 (e.g., the devices 132 and 134 may be "strong" and the devices 140 and 142 may be "weak"). In one example, the parameter z1 may have a nominal value of 10/10 and the parameter z2 may have a nominal value of 3/1. The parameter z1 may have a range, preferably 6/6 to 14/14 and more preferably 8/8 to 12/12. The parameter z2 may have a range, preferably 5/1 to 1/1 and more preferably 4/1 to 2/1. However, other values for the parameters z1 and z2 may be implemented accordingly to meet the design criteria of a particular application. The circuits 112a–112n may be coupled to the circuit 110 in response to the signals Da–Dn and DBA–DBn. Coupling the circuits 112a–112n to the circuit 110 may adjust the balance point of the circuit 100.

Figure 8A:
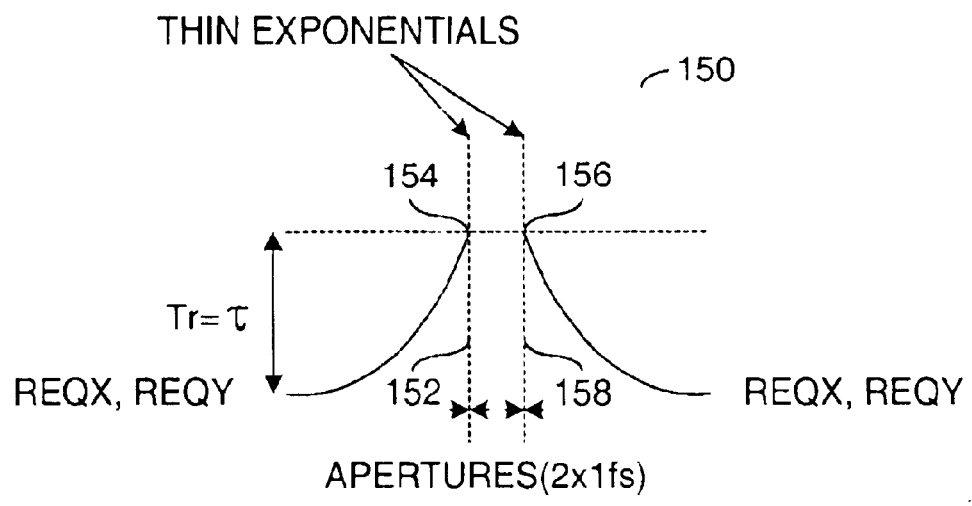
FIGS. 8(a–b) are timing diagrams of the circuit of FIG. 7.

Referring to FIG. 8a, a timing diagram 150 illustrating a time aperture window for the circuit of FIG. 7 is shown (when, as one example, two of the circuits 112 are implemented, e.g., n=2). The critical resolution time Tr may be equal to the time delay τ. The delay τ is generally equal to or greater than the switching time constant (e.g., Tsw) of the circuit 110. The circuit 100 may be configured such that the resolution time of the signals GRANTX_B and GRANTY_B may have thin exponentials (e.g., a time 152 to a time 154 and a time 156 to a time 158). The circuit 100 may have two metastable states (e.g., apertures) from the time 152 to the time 156. In one example, the circuit 100 may be configured to reduce the aperture to two thin exponential peaks each 1 fs wide. However, other aperture times may be implemented accordingly to meet the design criteria of a particular application. Increasing the number of stages may result in a higher number of metastable apertures but each with exceptionally small width.

Figure 8B:
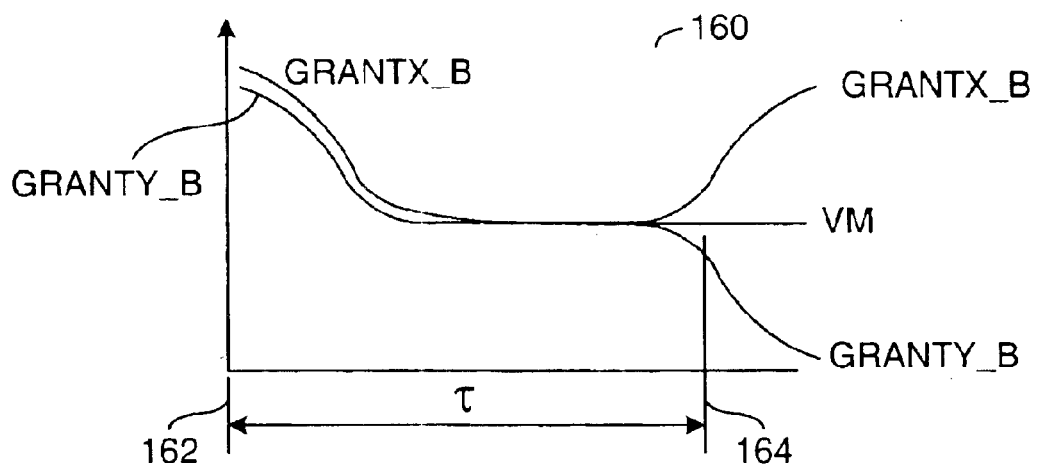

Referring to FIG. 8b, a timing diagram 160 illustrating a balance point adjustment of the circuit 100 is shown. The signals REQX and REQY may be asserted at a time 162. The circuit 100 may have a balance point VM between a time 162 and a time 164. The interval from the time 162 to the time 164 may be equal to the delay τ.

The circuit 100 may be configured to have an improved metastable failure rate by delayed adjustment of the balance point VM after the time 162. In the first embodiment, the circuit 100 may be configured to improve the metastable failure rate by adjusting the balance point during or after the delay τ. When the circuit 100 is implemented with more than one of the circuits 112, 114, and 116, the failure rate of the circuit 100 may be further improved when compared to the circuit 10. For two stages of the circuit 112 (e.g., n=2), the circuit 100 may increase the mean time between failures (MBTF) of the circuit 100 by 1,500 times when compared to the circuit 10. Increasing the number of circuits 112 generally results in successive balance point adjustments during or after the interval τ shown in FIGS. 8(a–b) and further improves the MTBF.

Figure 9:
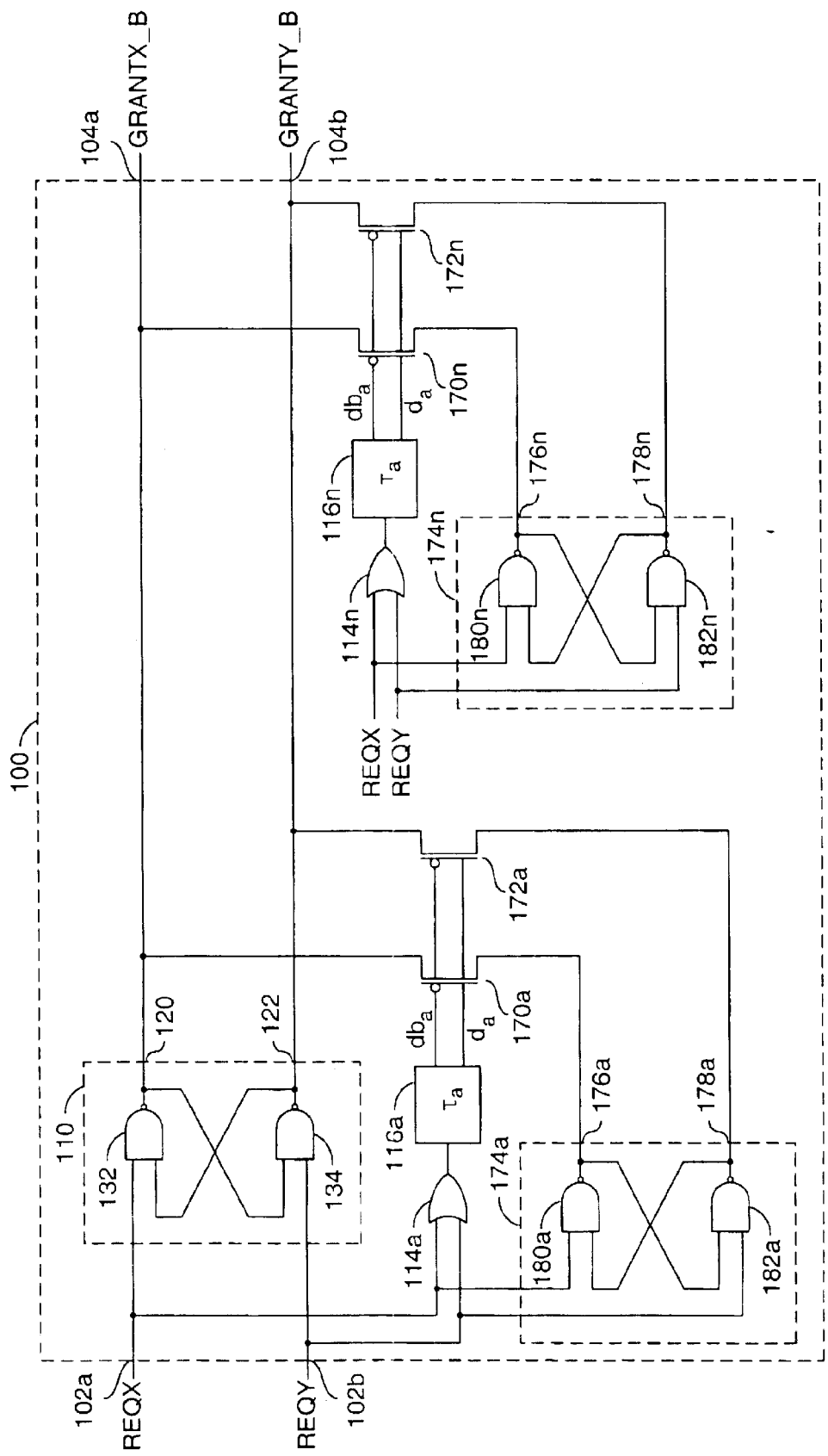
FIG. 9 is a detailed block diagram of an alternative embodiment of the circuit of FIG. 6.

Referring to FIG. 9, a detailed block diagram illustrating a second embodiment of the circuit 100 is shown. In the second embodiment the circuit 100 generally comprises the circuit 110, one or more of the devices 114a–114n, one or more of the circuits 116a–116n, one or more devices 170a–170n, one or more devices 172a–172n, and one or more circuits 174a–174n. The devices 170 and 172 may be implemented as pass gates. However, other appropriate coupling devices may be implemented to meet the design criteria of a particular application. The circuits 174a–174n may be implemented as cross-coupled NAND gate arbiter circuits.

The device 170 may have a first source/drain that may receive the signal GRANTX_B, an inverting gate that may receive the signal DB from the first output of the circuit 116, a non-inverting gate that may receive the signal D from the second output of the circuit 116, and a second source/drain that may be coupled to an output 176 of the circuit 174. The device 172 may have a first source/drain that may receive the signal GRANTY_B, an inverting gate that may receive the signal DB from the first output of the circuit 116, a non-inverting gate that may receive the signal D from the second output of the circuit 116, and a second source/drain that may be coupled to an output 178 of the circuit 174. The devices 170a–170n 172a–172n may be configured to couple the circuits 174a–174n to the outputs 120 and 122 of the circuit 110 in response to the signals REQX and REQY and the delays τa–τn. The circuits 174a–174n may be configured to adjust the balance point of the circuit 100 after the delays τa–τn, respectively. When the circuits 174a–174n are progressively turned on, the balance point of the circuit 100 may be progressively adjusted in a given direction.

The circuit 174 may have a first input that may receive the signal REQX and second input that may receive the signal REQY. The circuit 174 may comprise a device 180 and a device 182. The devices 180 and 182 may be implemented as logical NAND gates. The device 180 may have a first input that may receive the signal REQX, a second input that may be coupled to an output of the device 182, and an output that may be coupled to the output 176 and a first input of the device 182. The device 182 may have a second input that may receive the signal REQY and an output that may be coupled to the output 178. The circuit 174 may be implemented as a cross-couple NAND gate arbiter circuit similarly to the circuit 110. The devices 180 and 182 may be configured having a z value (e.g., z2) similar to the z value of the devices 140 and 142 of FIG. 7 (e.g., the circuit 174 may be "weak" when compared to the circuit 110).

In the second embodiment, the circuit 100 may be configured to improve the metastable failure rate (e.g., adjust the balance point of the signals REQX and REQY) by introducing contention after the adjustable delay $\tau a$. When the circuit 100 is implemented with more than one of the circuits 114, 116, 170, 172 and 174, the failure rate of the circuit 100 may be further improved when compared to the circuit 10. When the second embodiment of the circuit 100 is implemented with two of the circuits 174 (e.g., n=2), the circuit 100 may increase the mean time between failures (MTBF) of the circuit 100 by 1,500 times when compared to the circuit 10.

Figure 10:
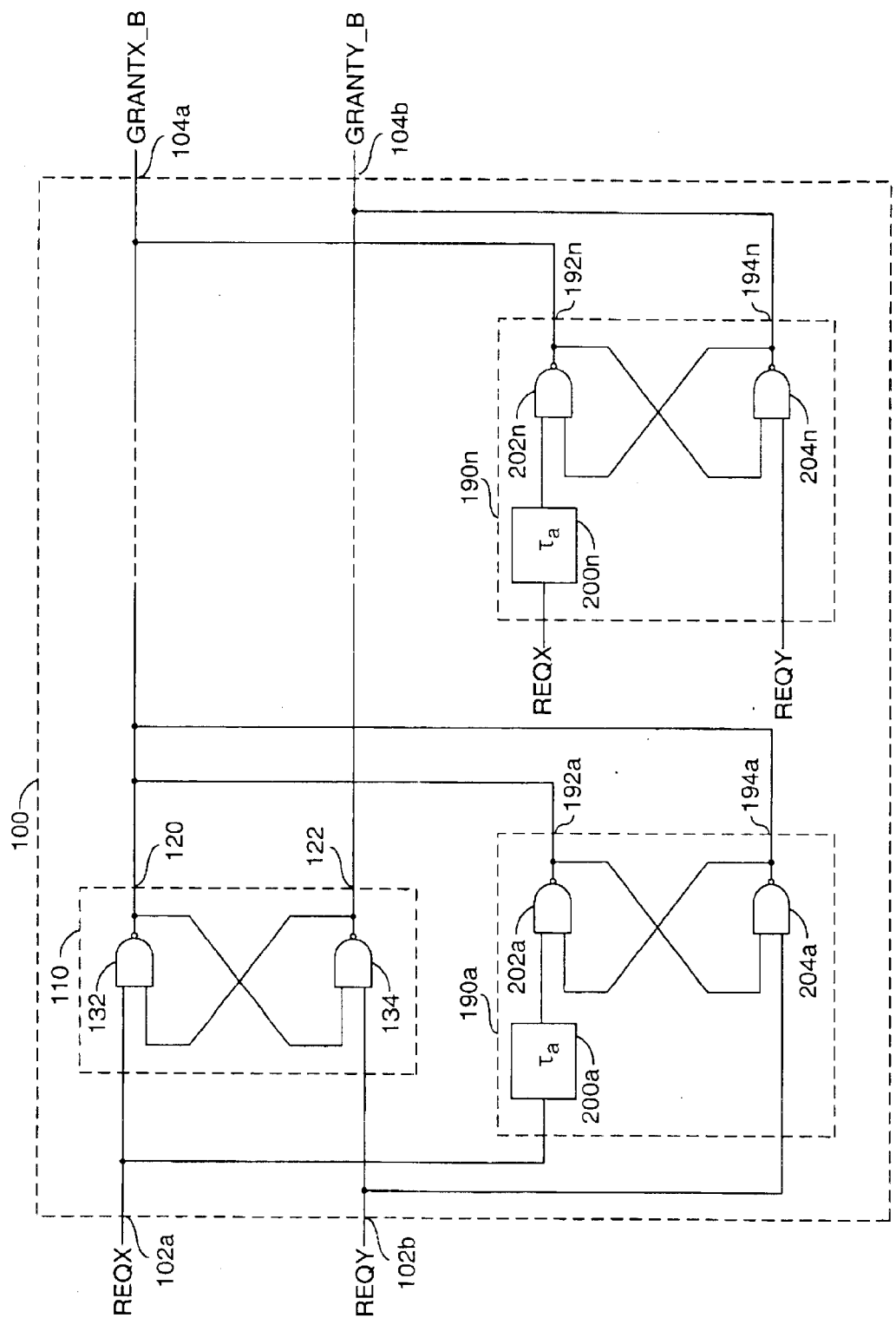
FIG. 10 is a block diagram of another alternative embodiment of the circuit of FIG. 6.

Referring to FIG. 10, a detailed block diagram illustrating a third embodiment of the circuit 100 is shown. In the third embodiment, the circuit 100 generally comprises the circuit 110 and one or more circuits 190a–190n. The circuits 190a–190n may be implemented as cross-coupled NAND gate arbiters. The circuit 190 may have a first input that may receive the signal REQX, a second input that may receive the signal REQY, an output 192 that may present the signal GRANTX_B, and an output 194 that may present the signal GRANTY_B.

The circuit 190 may comprise a circuit 200, a device 202, and a device 204. The circuits 200a–200n may be implemented as delay circuits (or elements) having the delay $\tau a$–$\tau n$, respectively. The circuits 200a–200n may introduce the time delay $\tau a$–$\tau n$ into the signal REQX. The devices 202 and 204 may be implemented as logical NAND gates. The circuit 200 may have an input that may receive the signal REQX and an output that may be coupled to a first input of the device 202. The device 202 may have a second input that may be coupled to an output of the device 204 and an output that may be coupled to a first input of the device 204 and the output 192. The device 204 may have a second input that may receive the signal REQY and an output that may be coupled to the output 194. The devices 202 and 204 may be configured as cross-coupled NAND gates. The devices 202 and 204 may be implemented as "weak" (e.g., z2) devices. The circuits 190a–190n may be configured to couple to the output of the circuit 110 in response to the signals REQX and REQY after the delays $\tau a$–$\tau n$.

In the third embodiment, the circuit 100 may be configured to improve the metastable failure rate (e.g., adjust the balance point) by introducing contention after the adjustable delay $\tau a$. When progressive stages of the circuits 190a–190n are implemented, the balance point of the circuit 100 may be progressively adjusted in a given direction. When the circuit 100 is implemented with more than one of the circuits 190, the failure rate of the circuit 100 may be further improved when compared to the circuit 10. When the third embodiment of the circuit 100 is implemented with two of the circuits 190 (e.g., n=2), the third embodiment of the circuit 100 may increase the mean time between failures (MBTF) of the circuit 100 by 1,500 times when compared to the circuit 10.

Figure 11:
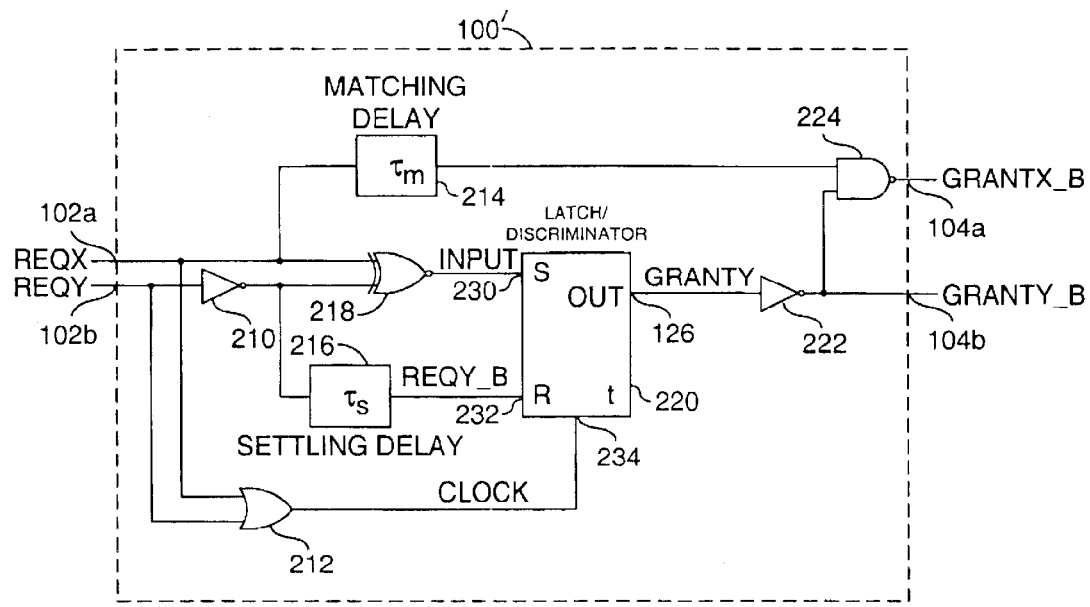
FIG. 11 is a block diagram of another embodiment of the circuit of FIG. 6.

Referring to FIG. 11, a block diagram of a circuit 100' illustrating another preferred embodiment of the present invention is shown. The circuit 100' generally comprises a device 210, a device 212, a circuit 214, a circuit 216, a device 218, a circuit 220, a device 222, and a device 224. In one example, the devices 210 and 222 may be implemented as inverting amplifiers (e.g., inverters). The device 212 may be implemented as a logical OR gate. The device 212 may be configured to generate a timing control signal (e.g., CLOCK) in response to the signals REQX and REQY. The circuits 214 and 216 may be implemented as delay circuits (or elements). The device 218 may be implemented as a logical NOR gate. The circuit 220 may be implemented as a latch/discriminator circuit. The device 224 may be implemented as a logical NAND gate.

The circuit 214 may be configured to provide a delay (e.g., $\tau m$) to the signal REQX that may match the circuit 100' propagation times for the signals REQX and REQY. The circuit 216 may be configured to provide a delay (e.g., $\tau s$) to a digital complement (or inverse) of the signal REQY (e.g., REQY_B) that may equal the settling time of the circuit 100'. The device 218 may be configured to generate a signal (e.g., INPUT) in response to the signals REQX and REQY. The signal INPUT may be an intermediate bus control signal.

The circuit 220 may have an input 230 that may receive the signal INPUT (e.g., an "s" input), an input 232 that may receive a signal (e.g., REQY_B) (e.g., an "r" input), an input 234 that may receive the signal CLOCK (e.g., a "t" input), and an output 236 that may present the signal GRANTY (e.g., an "out" output). The signal REQY_B may be the digital complement (e.g., inverse) of the signal REQY.

Figure 12:
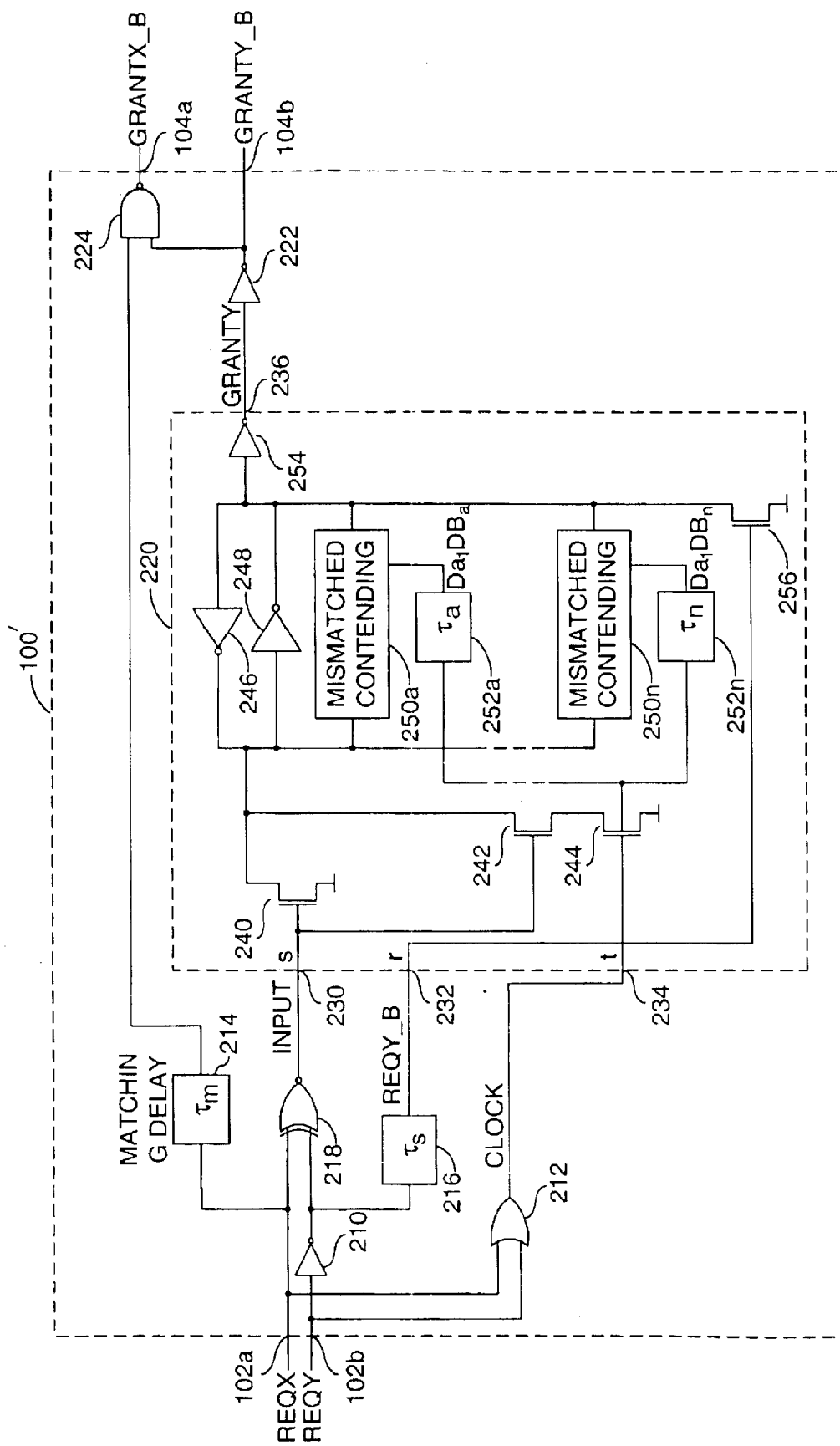
FIG. 12 is a detailed block diagram of the circuit of FIG. 11.

Referring to FIG. 12, a more detailed block diagram illustrating the circuit 100' of FIG. 11 is shown. In one example, the circuit 220 may comprise a device 240, a device 242, a device 244, a device 246, a device 248, one or more circuits 250a–250n, one or more circuits 252a–252n, a device 254, and a device 256. The devices 240, 242, 244, and 256 may be implemented as one or more MOS transistors. The devices 246, 248, and 254 may be implemented as inverting amplifiers (e.g., inverters). The devices 246 and 248 may be configured as a jamb latch. The circuits 250a–250n may be implemented as mismatched contending circuits (described in more detail in connection with FIGS. 13 and 14).

The circuits 252a–252n may be implemented as delay circuits (or elements) having the time delay $\tau a$–$\tau n$, respectively. The time delays $\tau a$–$\tau n$ are generally equal to or greater than the latch switching time constant Tsw of the circuit 220. The circuits 252a–252n may be configured to present the signals Da–Dn/DBA–DBn to a first input of the circuits 250a–250n in response to the signal CLOCK. The signals Da–Dn/DBA–DBn may operate as control signals that may enable (e.g., turn on) the circuits 250a–250n, respectively, in response to the signals REQX and REQY and the delays $\tau a$–$\tau n$. The circuit 220 may be configured to have a total delay $\tau$ that may be equal to the sum of the delays $\tau a$–$\tau n$.

In another example (not shown), the circuit 220 may be implemented without the circuits 252a–252n (e.g., the circuits 252a–252n may be optional). The signal CLOCK may operate as a control signal that may enable (e.g., turn on) the circuits 250a–250n. The signal CLOCK is generally asserted (e.g., digital HIGH) when the circuit 100' operates in a discriminating mode (e.g., when a rising edge of the signal CLOCK is synchronized to the signal INPUT).

The device 246 may have an input that may be coupled to an output of the device 248 and an output of the circuits 250a–250n, and an output that may be coupled to an input of the device 248 and a second input of the circuits 250a–250n (e.g., the circuits 250a–250n may be coupled in parallel to the devices 246 and 248 and to each other). The devices 246 and 248 may be implemented as a jamb latch arbiter circuit similarly to the devices 64 and 66 of FIG. 5.

The devices 246 and 248 are generally implemented as "strong" devices (e.g., z1 devices). Latching devices in the circuits 250a–250n are generally implemented as "weak" devices (e.g., z2 devices). When the circuits 250a–250n are turned off, the devices 246 and 248 generally arbitrate the signals REQX and REQY. When the devices 246 and 248 are in a metastable state, one or more of the circuits 250a–250n are generally turned on and cause an unbalance in the circuit 220. When the circuits 250a–250n are progressively turned on, the balance point of the circuit 100' may be progressively adjusted in a given direction. The unbalance in the circuit 220 generally causes the devices 246 and 248 to transition from the metastable state such that the circuit 100' arbitrates the signals REQX and REQY.

The circuit 100' may be implemented as an arbiter circuit having a pulse discriminator with an improved metastable failure rate by implementing a delayed balance point and/or contention adjustment (e.g., the adjustment of the balance point of the circuit 100' may be delayed by the adjustable delays τa–τn). The circuit 100' may be implemented having a more narrow aperture window than the circuit 40. The circuit 100' may have improved metastable performance when compared to the circuit 40. Implementing the circuit 220 with more than one of the circuits 250 and 252 may additionally improve the failure rate of the circuit 100' when compared to the circuit 40.

Figure 13:
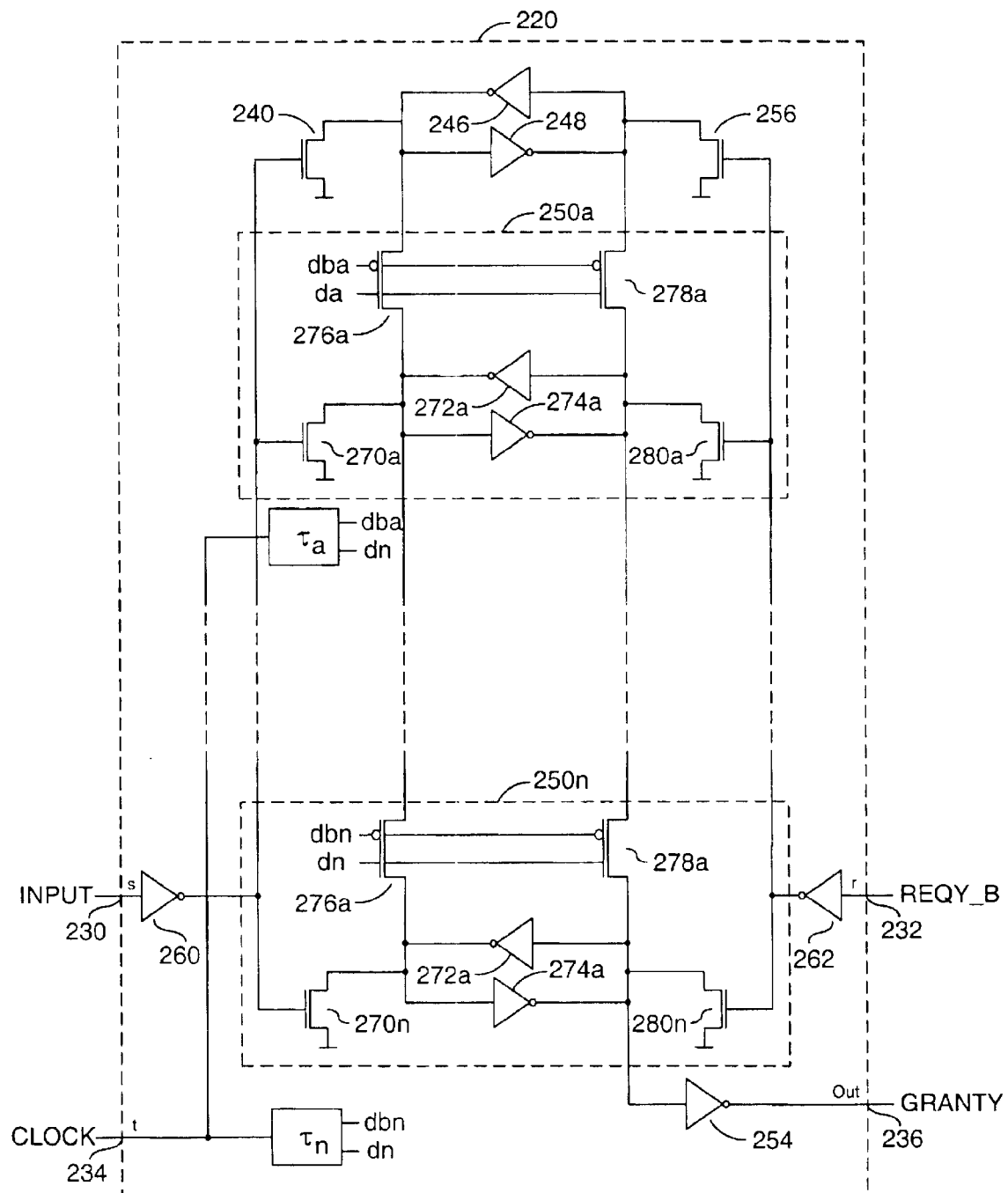
FIG. 13 is a detailed block diagram of a latch/discriminator circuit of FIG. 12.

Referring to FIG. 13, a detailed block diagram illustrating an embodiment of the circuit 220 of FIGS. 11 and 12 is shown. In one example, the circuit 250 comprises a device 270, a device 272, a device 274, a device 276, a device 278, and a device 280. The devices 270, 272, 274, and 280 may be implemented as a jamb latch circuit. The devices 272 and 274 may be implemented as "weak" (e.g., z2) devices. The devices 276 and 278 may be implemented as pass gates. However, other appropriate coupling devices may be implemented to meet the design criteria of a particular application. The devices 276 and 278 may be configured to couple the circuit 250 to the devices 246 and 248 in response to the signals D and DB.

Figure 14:
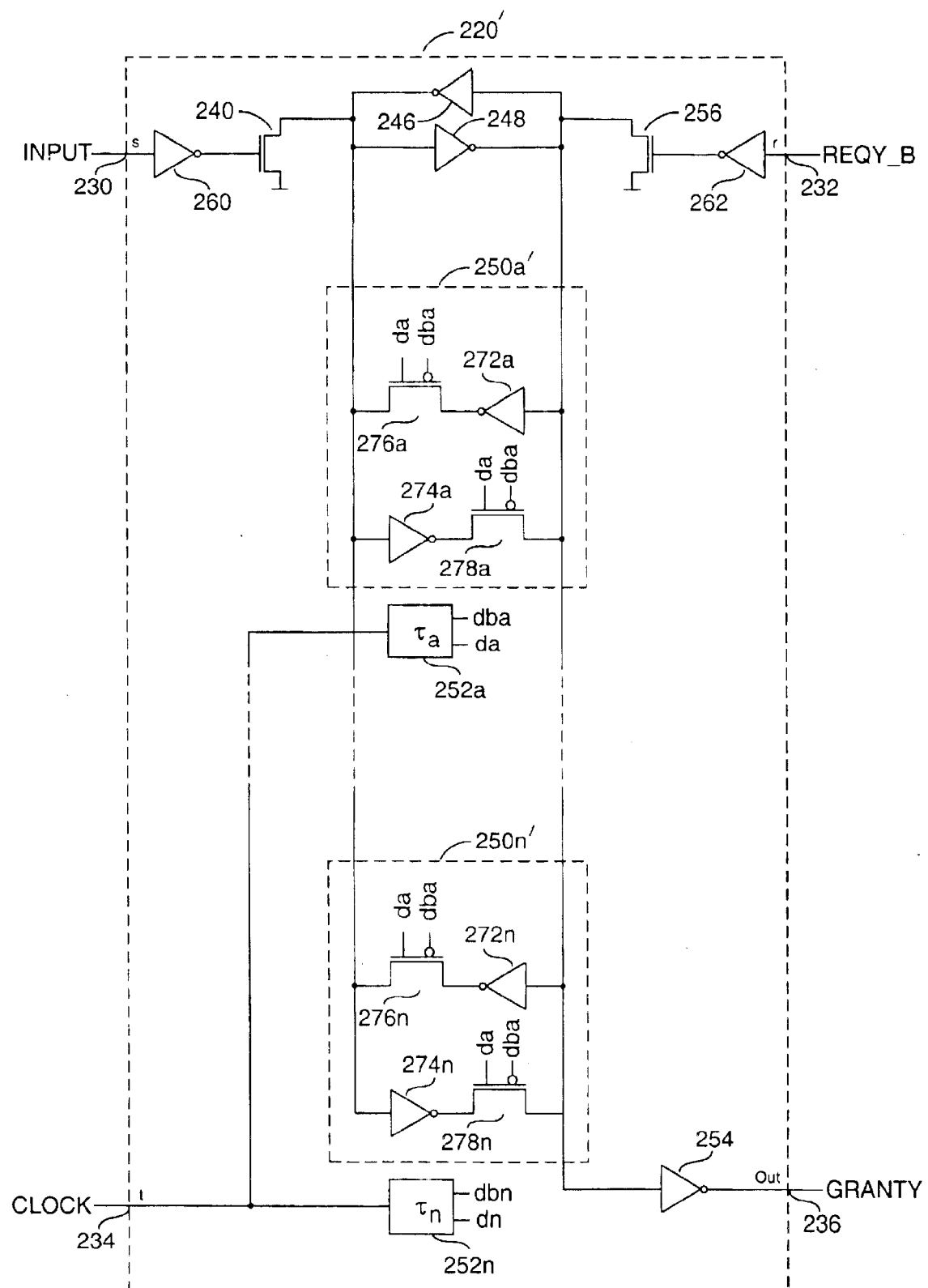
FIG. 14 is a detailed block diagram of an alternative latch/discriminator circuit of FIG. 12.

Referring to FIG. 14, a detailed block diagram 220' illustrating an alternative embodiment of the circuit 220 of FIGS. 11 and 12 is shown. In one example, the circuit 220' comprises the device 272, the device 274, the device 276, and the device 278. The devices 272 and 274 may be implemented as a latch circuit. The device 276 may be coupled between an output of the device 272 and a first output of the circuit 250. The device 278 may be coupled between an output of the device 274 and a second output of the circuit 270. The circuit 220' may operate similarly to the circuit 220.

Figure 15:
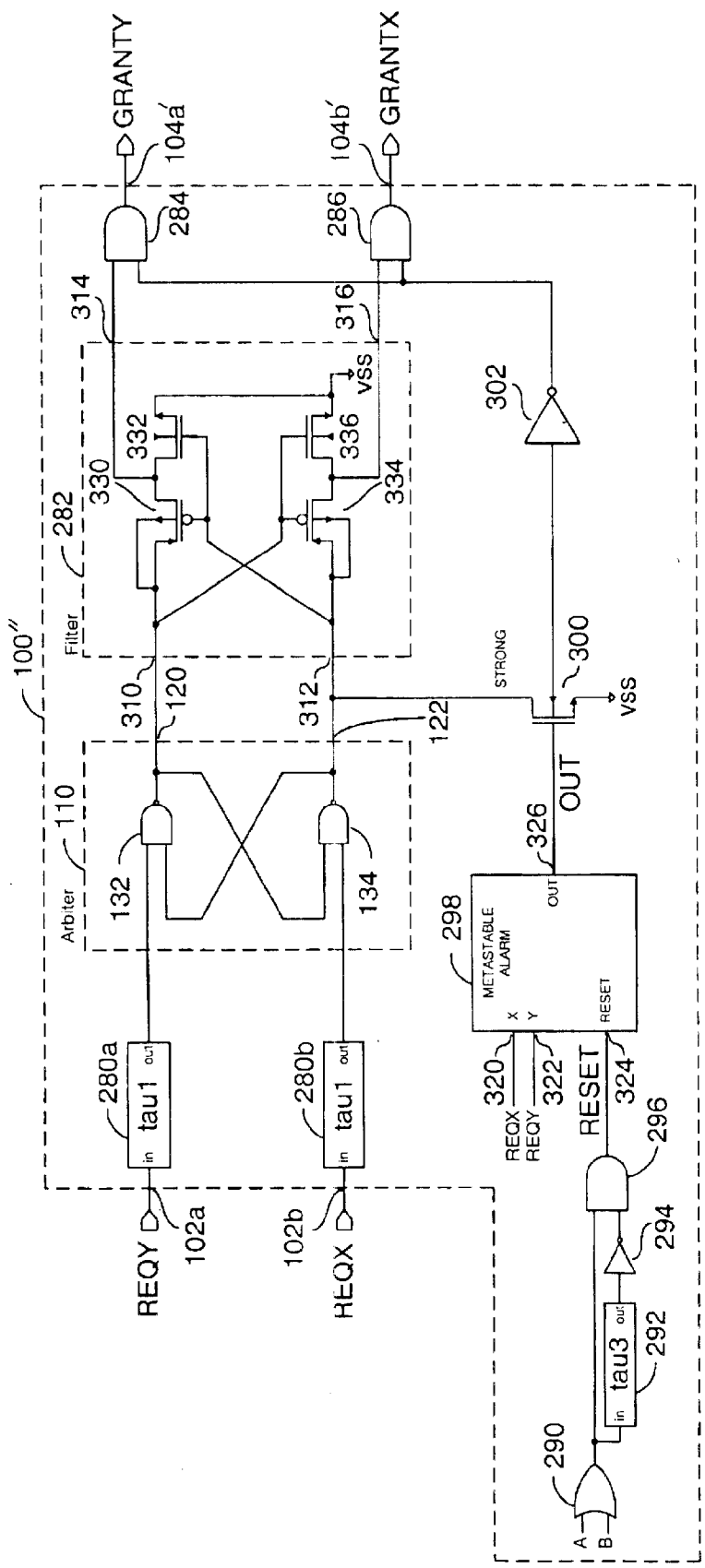
FIG. 15 is a block diagram of another embodiment of the circuit of FIG. 6.

Referring to FIG. 15, a detailed block diagram of a circuit 100" illustrating another alternative embodiment of the circuit 100 is shown. The circuit 100" may have an output 104a' that may present a signal (e.g., GRANTY) and an output 104b' that may present a signal (e.g., GRANTX). The signals GRANTX and GRANTY are generally the digital complements (e.g., inverses) of the signals GRANTX_B and GRANTY_B, respectively. The circuit 100" generally comprises the circuit 110, a pair of circuits 280 (e.g., 280a and 280b), a circuit 282, a device 284, a device 286, a device 290, a circuit 292, a device 294, a device 296, a circuit 298, a device 300, and a device 302. The circuits 280 and 292 may be implemented as delay circuits. The circuit 282 may be implemented as a filter circuit. The circuit 298 may be implemented as a look-ahead alarm circuit. The circuit 100" may be implemented as an arbiter circuit having metastable state avoidance using a metastability look-ahead alarm circuit.

The circuit 280a may have an input that may receive the signal REQX and an output that may be coupled to the first input of the circuit 110. The circuit 280a may be configured as a delay circuit (or element) having a time delay (e.g., $\tau_1$). The time delay $\tau_1$ may be an interval that may correspond to the switching time constant Tsw of the circuit 110. The circuit 280b may have an input that may receive the signal REQY and an output that may be coupled to the second input of the circuit 110. The circuit 280b may be configured as a delay circuit (or element) having the time delay $\tau_1$. The $\tau_1$ time may be a matching delay to delay the transmission of the signals REQX and REQY through the circuit 100' until the alarm circuit 298 has evaluated the phase proximity of the signals REQX and REQY.

The circuit 282 may have an input 310 that may receive the signal GRANTX_B, an input 312 that may receive the signal GRANTY_B and may be coupled to a drain of the device 300, an output 314 that may present a signal (e.g., A), and an output 316 that may present a signal (e.g., B). The circuit 282 may be configured as a filter circuit. The circuit 282 may be configured to generate the signals A and B in response to the signals GRANTX_B and GRANTY_B and a signal (e.g., OUT). The signals A and B may be intermediate control (grant) signals that may correspond to the signals GRANTX and GRANTY, respectively. The signal OUT may be a look-ahead alarm signal (described in more detail in connection with FIGS. 16 and 17(a–d) below). The signal OUT may be asserted in response to the signals REQX and REQY and the delay $\tau_1$ when the arbiter circuit 110 is in a metastable state.

The circuit 282 generally comprises a device 330, a device 332, a device 334, and a device 336. The device 330 may have a source and a well that may receive the signal GRANTX_B and may be coupled to gates of the devices 334 and 336, a gate that may receive the signal GRANTY_B and may be coupled to a gate of the device 332 and a source and a well of the device 334, and a drain that may present the signal A and may be coupled to a drain of the device 332. The device 332 may have a source that may receive the supply ground VSS and may be coupled to a source of the device 336. The device 334 may have a drain that may present the signal B and may be coupled to a drain of the device 336. In one example, the devices 330 and 334 may be implemented as one or more PMOS transistors and the devices 332 and 336 may be implemented as one or more NMOS transistors.

The device 284 may have a first input that may receive the signal A, a second input that may be coupled to an output of the device 302, and an output that may present the signal GRANTY. The device 286 may have a first input that may receive the signal B, a second input that may be coupled to the output of the device 302, and an output that may present the signal GRANTY. In one example, the devices 284 and 286 may be implemented as logical AND gates.

The device 290 may have a first input that may receive the signal A, a second input that may receive the signal B, and an output that may be coupled to an input of the circuit 292 and a first input of the device 296. In one example, the device 290 may be implemented as a logical OR gate. The circuit 292 may have an output that may be coupled to the input of the device 294. The circuit 292 may be implemented as a delay circuit (or element) having a time delay (e.g., $\tau_3$). The circuit 292 may be configured to set the settling time of the circuit 100" (e.g., the time delay 13).

The device 294 may have an output that may be coupled to a second input of the device 296. The device 294 may be configured as an inverting amplifier (e.g., inverter). The device 296 may have an output that may present a signal (e.g., RESET). The device 296 may be configured to generate the signal RESET in response to the signals A and B and the delay 13. The signal RESET may be a control signal that may reset the circuit 298. In one example, the device 296 may be implemented as a logical AND gate.

The circuit 298 may have an input 320 that may receive the signal REQX, an input 322 that may receive the signal REQY, an input 324 that may receive the signal RESET, and an output 326 that may present the signal OUT. The circuit 298 maybe implemented as a metastability look-ahead alarm circuit. The look-ahead circuit 298 may be configured to adjust the balance point of the circuit 100".

The device 300 may have a gate that may receive the signal OUT and a source that may be connected to a supply ground (e.g., VSS). In one example, the device 300 may be implemented as one or more NMOS transistors. The device 300 may be implemented as a "strong" (e.g., z1) device similarly to the devices 132 and 134. The device 302 may have an input that may receive the signal OUT. The device 302 may be configured as an inverting amplifier (e.g., inverter).

Figure 16:
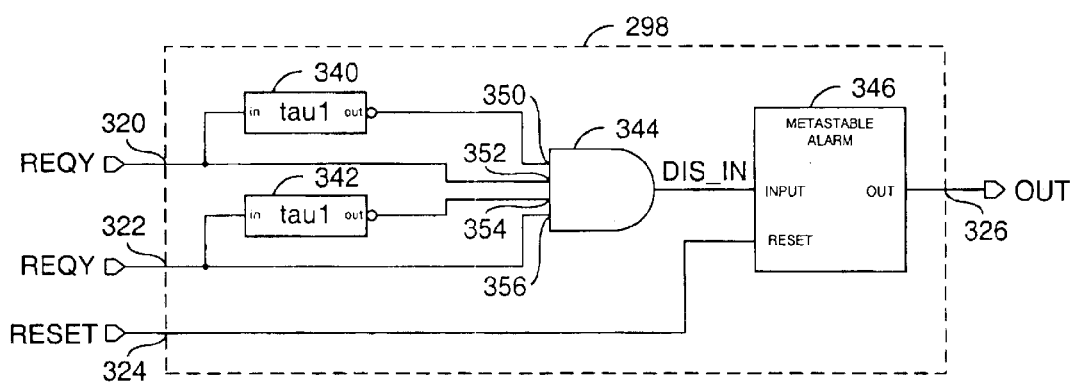
FIG. 16 is a block diagram of a look-ahead alarm circuit of FIG. 15.

Referring to FIG. 16, a block diagram illustrating the circuit 298 is shown. The circuit 298 generally comprises a circuit 340, a circuit 342, a device 344, and a circuit 346. The circuit 340 may have an input that may receive the signal REQX and an inverting output that may be coupled to an input 350 of the device 344. The circuit 340 may be implemented as a delay circuit (or element) having the time delay $\tau_1$. The circuit 342 may have an input that may receive the signal REQY and an inverting output that may be coupled to an input 354 of the device 344. The circuit 342 may be implemented as a delay circuit (or element) having the time delay $\tau_1$. The device 344 may be implemented as a logical gate. The circuit 346 may be implemented as a discriminator circuit.

The device 344 may have an input 352 that may receive the signal REQX, an input 356 that may receive the signal REQY, and an output that may present a signal (e.g., DIS_IN). In one example, the device 344 may be implemented as a logical AND gate. The signal DIS_IN may be an intermediate control signal. The device 344 may be configured to generate the signal DIS_IN in response to the signals REQX and REQY and the delay $\tau_1$.

The circuit 346 may have a first input that may receive the signal DIS_IN, a second input that may receive the signal RESET, and an output that may present the signal OUT. The circuit 346 may be implemented as a discriminator circuit of the type described in co-pending application Ser. No. 09/877,658 filed Jun. 7, 2001. However, any appropriate discriminator circuit may be implemented accordingly to meet the design criteria of a particular application. The circuit 346 may be configured to generate the signal OUT in response to the signal DIS_IN. The signal RESET may reset the circuit 346. The circuit 298 may be configured to present the signal OUT when the signals REQX and REQY are within close phase proximity. The circuit 298 may be configured to present the signal OUT when the rising edges of signals REQX and REQY are within 2*$\tau_1$ of each other (e.g., the skew between the signals REQX and REQY is less than 2*$\tau_1$). The circuit 298 may be configured to adjust the delay (and the balance point) of the circuit 100".

Referring to FIGS. 17(a–d), timing diagrams 370, 380, 410, and 430, respectively, illustrating the signals REQX, REQY, and DIS_IN are shown. Referring to FIG. 17a, the signals REQX and REQY may be asserted (e.g., a digital HIGH) at a time 372. The signal DIS_IN may be generated. After an interval equal to the delay $\tau_1$ from the time 372 (e.g., at a time 374), the signal DIS_IN may be de-asserted (e.g., a digital LOW). Referring to FIG. 17b, the signal REQX may be asserted at a time 382. The signal REQY may be asserted at a time 384. The interval from the time 382 to the time 384 may be equal to or greater than the delay $\tau_1$. The signal DIS_IN may be de-asserted during this time.

Figure 17A:
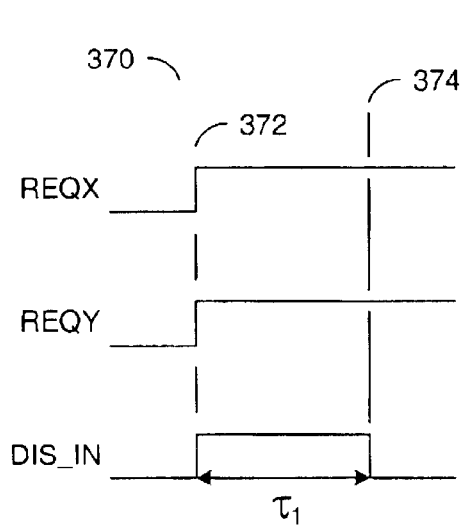
FIGS. 17(a–d) are timing diagrams of four modes of operation of the circuit of FIG. 16.
Figure 17B:
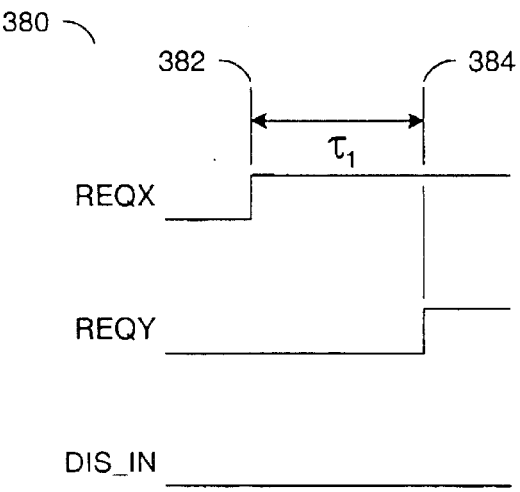
Figure 17C:
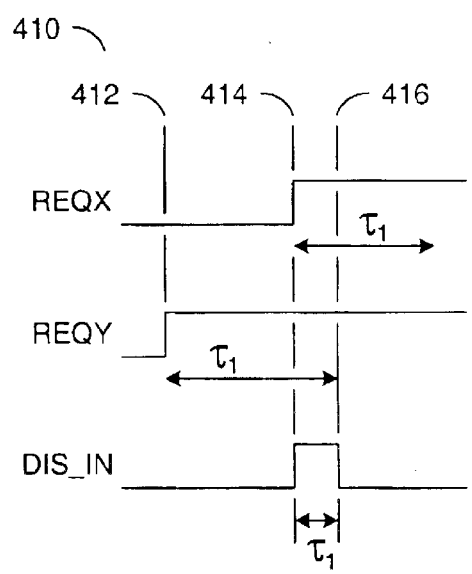

Referring to FIG. 17c, the signal REQY may be asserted at a time 412. The signal REQX may be asserted at a time 414. When the time 412 to the time 414 is less than the delay $\tau_1$ and the signals REQX and REQY remain asserted for at least the time $\tau_1$, the signal DIS_IN may be asserted at the time 414 and de-asserted at a time 416. The interval from the time 414 to the time 416 is generally a pulse having a duration less than the delay $\tau_1$.

Figure 17D:
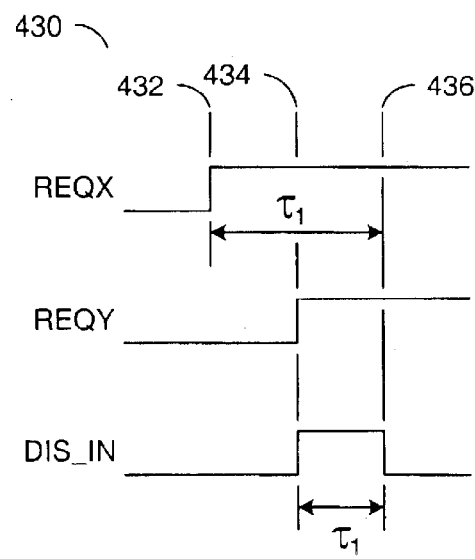

Referring to FIG. 17d, the signal REQX may be asserted at a time 432. The signal REQY may be asserted at a time 434. When the time 432 to the time 434 is less than the delay $\tau_1$ and the signals REQX and REQY remain asserted for at least the time $\tau_1$, the signal DIS_IN may be asserted at the time 434 and de-asserted at a time 436. The interval from the time 434 to the time 436 is generally a pulse having a duration less than the delay $\tau_1$. The signal DIS_IN is generally asserted as a pulse when the signals REQX and REQY are close in phase.

Referring back to FIG. 15, the circuit 100" may be configured to generate the signals GRANTX and GRANTY in response to the signals REQX, REQY RESET, and OUT (e.g., an adjustable delay). The circuit 100" may be configured to (i) delay the signals REQX and REQY by the time $\tau_1$, (ii) detect the likelihood of the circuit 110 entering a metastable state by assessing the phase proximity of the signals REQX and REQY in advance of the circuit 110 switching via the look-ahead circuit 298, and (iii) force the circuit 110 to arbitrate the signals REQX and REQY (e.g., adjust the balance point via the circuit 298). The circuit 100" may be implemented having a narrower (e.g., smaller) aperture window than the circuit 10. The circuit 100" may have improved metastable performance when compared to the circuit 10.

Figure 18:
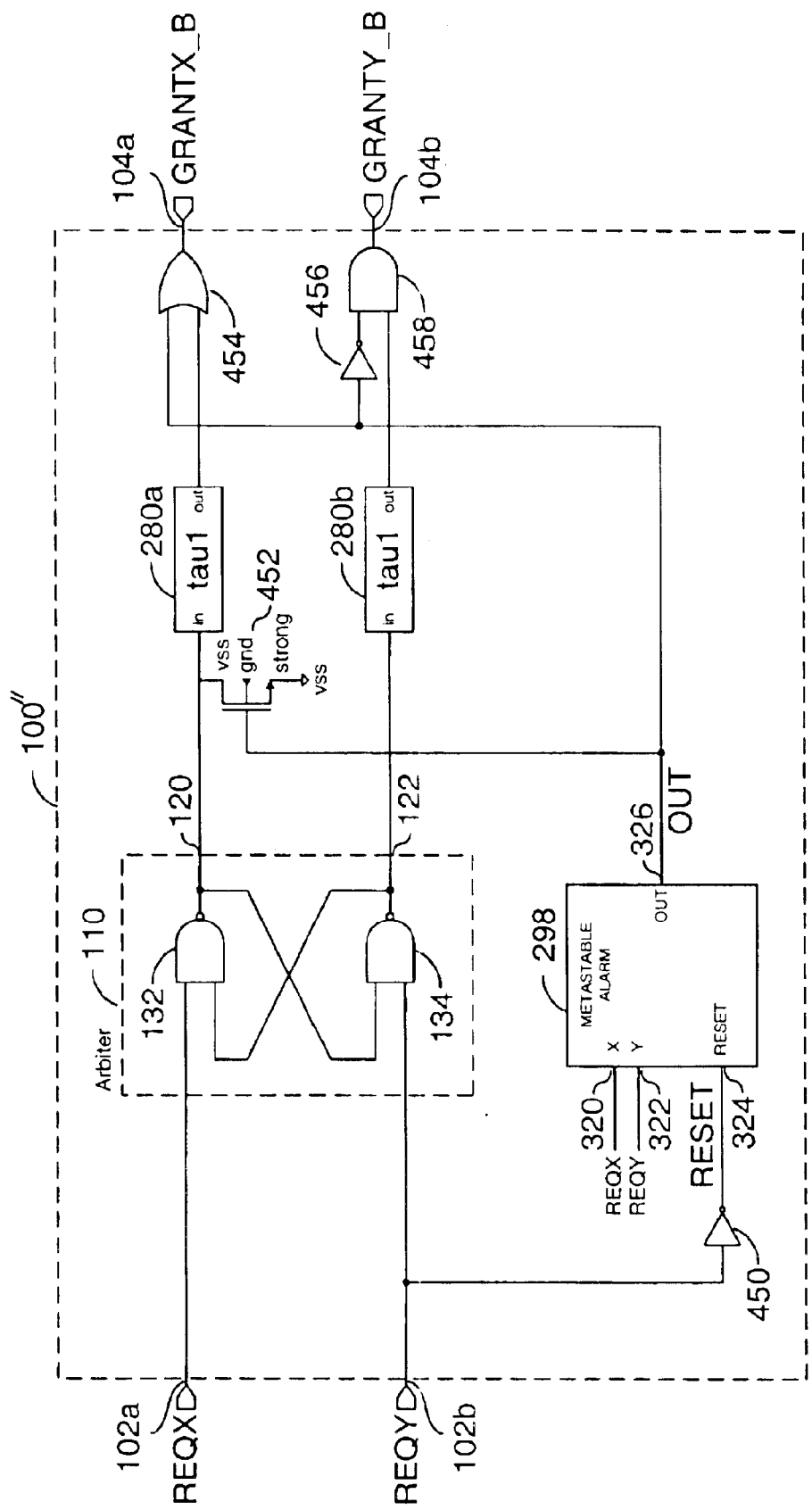
FIG. 18 is a block diagram of an alternative embodiment of the circuit of FIG. 15.

Referring to FIG. 18, a detailed block diagram of the circuit 100" illustrating another alternative embodiment of the circuit 100 is shown. The embodiment of the circuit 100" shown in FIG. 18 generally comprises the circuit 110, a pair of the circuits 280 (e.g., 280a and 280b), the circuit 298, a device 450, a device 452, a device 454, a device 456, and a device 458. The devices 450 and 456 may be implemented as inverters. The device 452 may be implemented as one or more NMOS transistors. The devices 454 and 458 may be implemented as logical gates.

The circuit 280a may have an input that maybe coupled to the output 120 of the circuit 110 and a drain of the device 452, and an output that may be coupled to a first input of the device 454. The circuit 280b may have an input that may be coupled to the output 122 of the circuit 110 and an output that may be coupled to a first input of the device 458. The device 450 may have an input that may receive the signal REQY and an output that may present the signal RESET. In one example, the device 450 may be implemented as an inverting amplifier (e.g., an inverter). The device 452 may have a gate that may receive the signal OUT, and a source and a well that may be coupled to the supply ground VSS. The device 452 may couple the signal GRANTX_B to the supply ground VSS in response to the signal OUT. In one example, the device 452 may be implemented as one or more NMOS transistors. However, any appropriate coupling device may be implemented accordingly to meet the design criteria of a particular application.

The device 454 may have a second input that may receive the signal OUT and an output that may present the signal GRANTX_B. The device 454 may be implemented as a logical OR gate. The device 454 may be configured to generate the signal GRANTX_B in response to the signals REQX, REQY and OUT and the delay $\tau_1$. The device 456 may have an input that may receive the signal OUT and an output that may be coupled to a second input of the device 458. The device 446 may be implemented as an inverting amplifier (e.g., inverter). The device 458 may have an output that may present the signal GRANTY_B. The device 458 may be implemented as a logical AND gate. The device 458 may be configured to generate the signal GRANTY_B in response to the signals REQX, REQY and OUT and the delay $\tau_1$.

The embodiment of the circuit 100" shown in FIG. 18 may be implemented as an arbiter circuit having metastable state avoidance using a look-ahead alarm circuit. The circuit 100" may be configured to (i) detect the likelihood of the circuit 110 entering a metastable state by assessing the phase proximity of the signals REQX and REQY in advance of the circuit 110 switching via the look-ahead circuit 298, (ii) force the circuit 110 to arbitrate the signals REQX and REQY (e.g., adjust the balance point via the circuit 298), and (iii) delay the signals GRANTX_B and GRANTY_B by the time $\tau_1$. The circuit 100" may be implemented having a more narrow aperture window than the circuit 10. The circuit 100" may have improved metastable performance when compared to the circuit 10.

Figure 19:
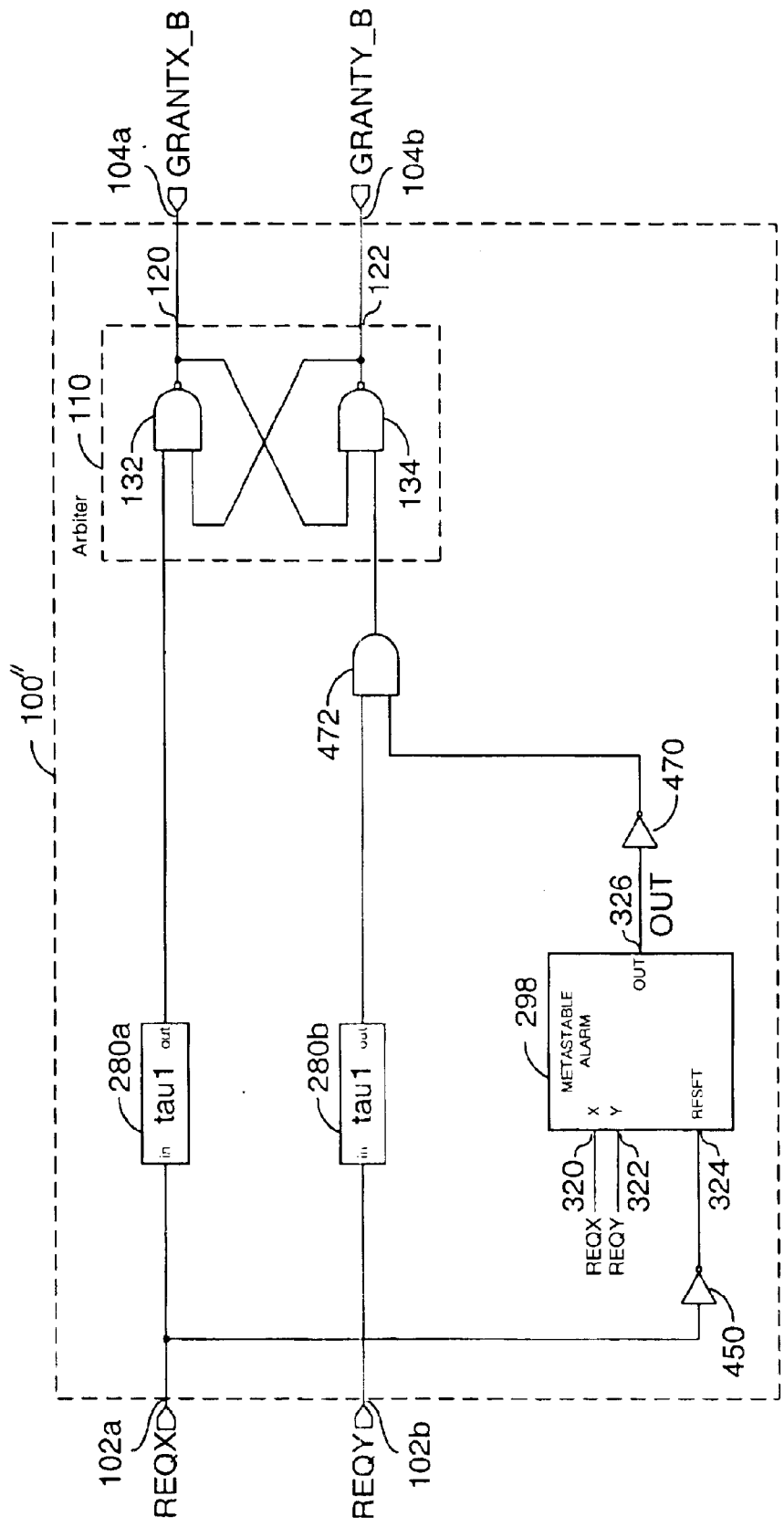
FIG. 19 is a block diagram of another alternative embodiment of the circuit of FIG. 15.

Referring to FIG. 19, a detailed block diagram of a circuit 100" illustrating another alternative of the circuit 100 is shown. The embodiment of the circuit 100" shown in FIG. 19 generally comprises the circuit 110, a pair of the circuits 280 (e.g., 280*a* and 280*b*), the circuit 298, the device 450, a device 470, and a device 472. The device 470 may be implemented as an inverter. The device 472 may be implemented as a logical gate. The circuit 100" may be implemented as an arbiter circuit having metastable state avoidance using a look-ahead alarm circuit.

The circuit 280*a* may have an input that may receive the signal REQX and an output that may be coupled to the first input of the circuit 110. The circuit 280*b* may have an input that may receive the signal REQY and an output that may be coupled to a first input of the device 472. The device 450 may have an input that may receive the signal REQX and an output that may present the signal RESET.

The device 470 may have an input that may receive the signal OUT and an output that may be coupled to a second input of the device 472. In one example, the device 470 may be implemented as an inverting amplifier (e.g., an inverter). The device 472 may have an output that may be coupled to the second input of the circuit 110. In one example, the device 472 may be implemented as a logical AND gate.

The circuit 100" may be configured to present the signals GRANTX_B and GRANTY_B in response to the signals REQX, REQY and OUT, and the delay $\tau_1$. The circuit 100" may be configured to (i) delay the signals REQX and REQY by the delay $\tau_1$, (ii) detect the likelihood of the circuit 110 entering a metastable state by assessing the phase and proximity of the signals REQX and REQY in advance of the circuit 110 switching via the look-ahead circuit 298, (iii) adjust the balance point via the circuit 298, and (iv) disable an input signal (e.g., REQY) when the circuit 110 is likely to enter a metastable state. The circuit 100" may be implemented having a more narrow aperture window than the circuit 10. The circuit 100" may have improved metastable performance when compared to the circuit 10.

Figure 20:
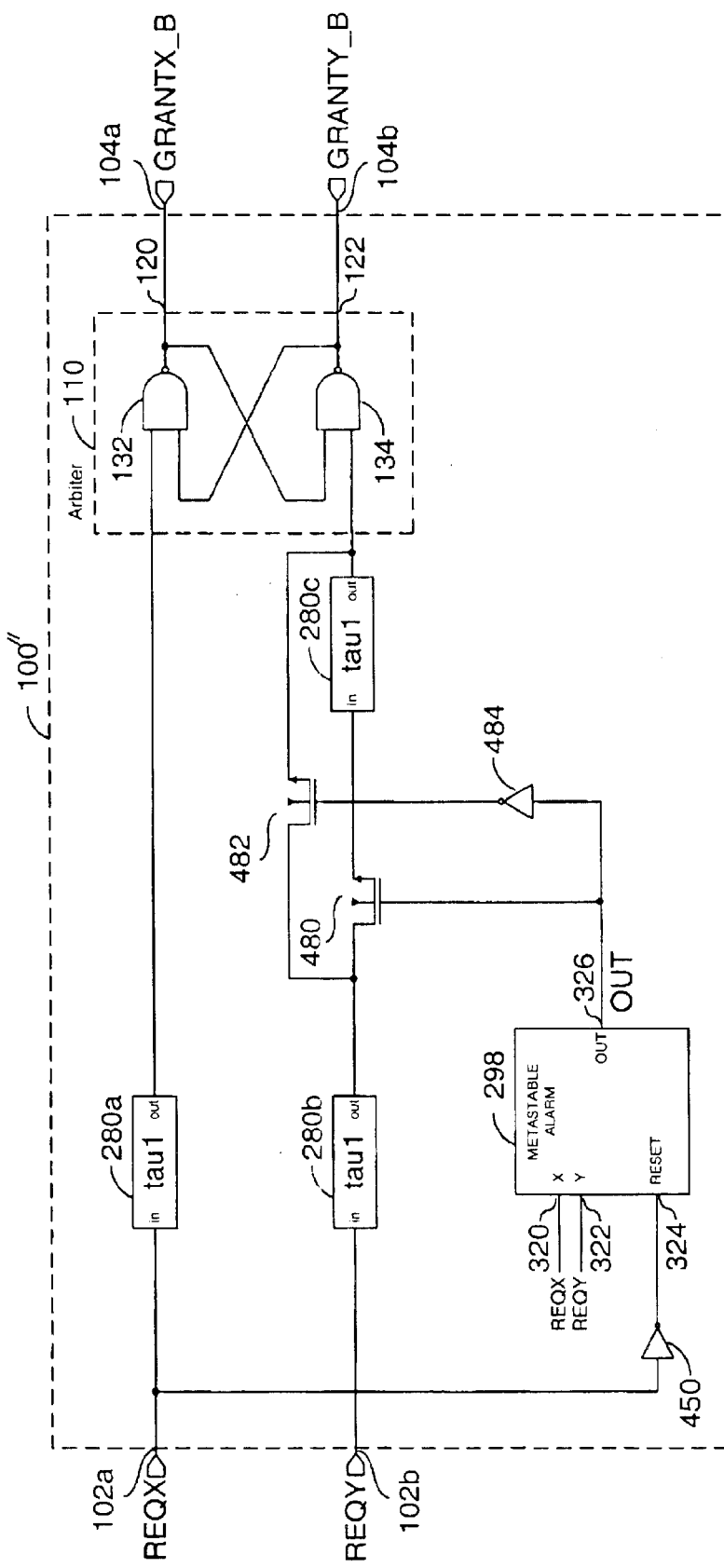
FIG. 20 is a block diagram of another alternative embodiment of the circuit of FIG. 15.

Referring to FIG. 20, a detailed block diagram of a circuit 100" illustrating another alternative embodiment of the circuit 100 is shown. The embodiment of the circuit 100 shown in FIG. 20 generally comprises the circuit 110, a plurality of the circuits 280 (e.g., 280*a*–280*c*), the circuit 298, the device 450, a device 480, a device 482, and a device 484. The devices 480 and 482 may be implemented as one or more NMOS transistors. The device 484 may be implemented as an inverter. The circuit 100" may be implemented as an arbiter circuit having metastable state avoidance using a look-ahead alarm circuit.

The circuit 280*a* may have an input that may receive the signal REQX and an output that may be coupled to the first input of the circuit 110. The circuit 280*b* may have an input that may receive the signal REQY and an output that may be coupled to drains of the devices 480 and 482. The circuit 280*c* may have an output that may be coupled to the second input of the circuit 110. The device 480 may have a gate that may receive the signal OUT and a source that may be coupled to an input of the circuit 280*c*. The device 482 may have a gate that may be coupled to an output of the device 484 and a source that may be coupled to the second input of the circuit 110. In one example, the devices 480 and 482 may be implemented as one or more NMOS transistors. The devices 480 and 482 may be configured as switching devices. However, any appropriate switching devices may be implemented accordingly to meet the design criteria of a particular application. The circuit 298 may be configured to couple or decouple the circuit 280*c* (e.g., the delay $\tau_1$) to the second input of the circuit 110 in response to the signals REQX and REQY via the devices 480 and 482. The device 484 may have an input that may receive the signal OUT. The device 484 may be implemented as an inverting amplifier (e.g., inverter). The device 450 may have an input that may receive the signal REQX and an output that may present the signal RESET.

The circuit 100" may be configured to present the signals GRANTX_B and GRANTY_B in response to the signals REQX, REQY and OUT, and the delay $\tau_1$. The circuit 100" may be configured to (i) delay the signals REQX and REQY by the time $\tau_1$, (ii) detect the likelihood of the circuit 110 entering a metastable state by assessing the phase proximity of the signals REQX and REQY in advance of the circuit 110 switching via the look-ahead circuit 298, (iii) adjust (e.g., increase) the delay of an input signal (e.g., REQX or REQY) when the circuit 110 is likely to enter a metastable state, and (iv) adjust the balance point via the circuit 298. The circuit 100" as illustrated in FIG. 20 may be implemented having a more narrow aperture window than the circuit 10. The circuit 100" may have improved metastable performance when compared to the circuit 10.

Figure 21:
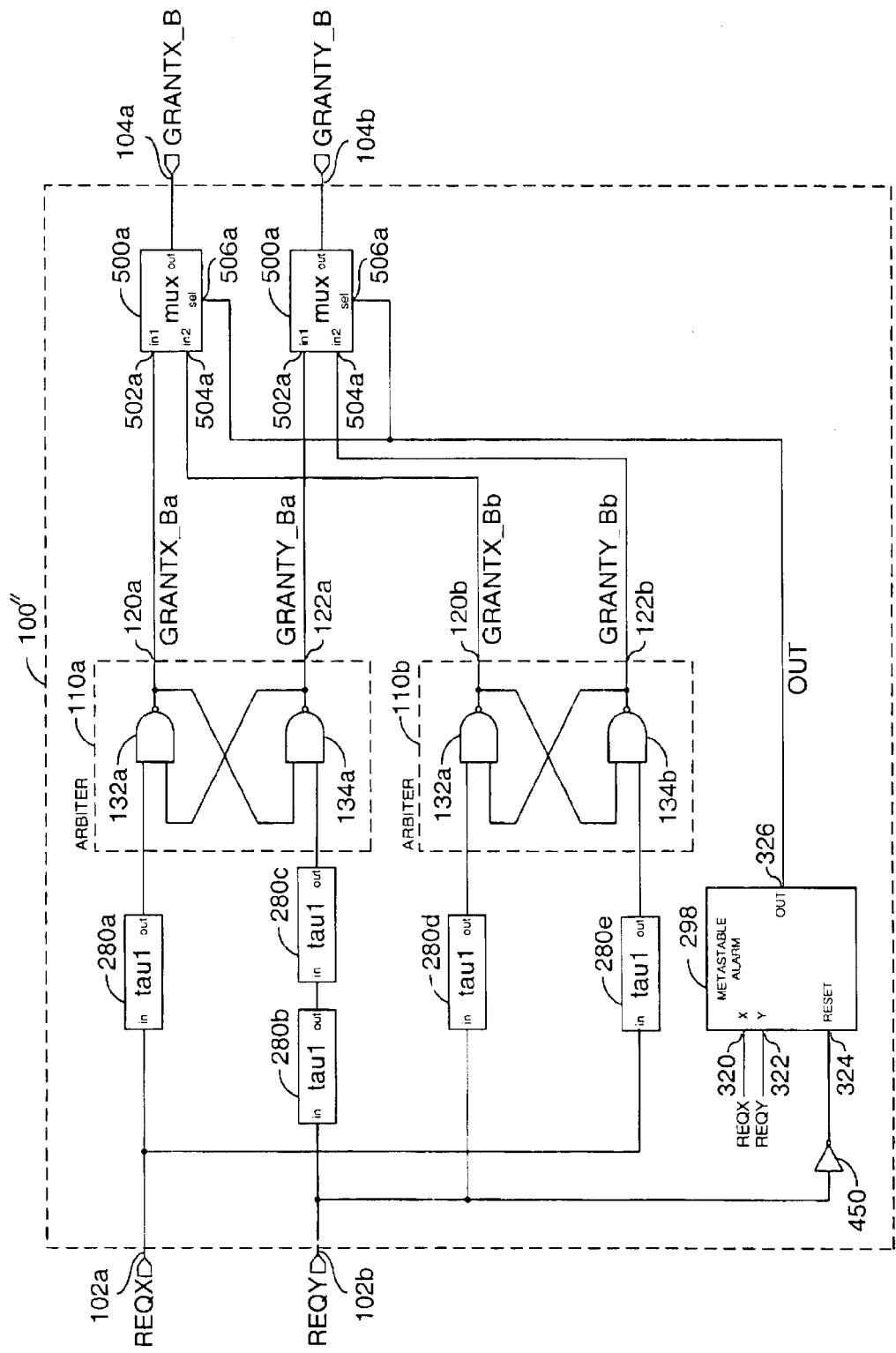
FIG. 21 is a block diagram of another alternative embodiment of the circuit of FIG. 15.

Referring to FIG. 21, a detailed block diagram of the circuit 100" illustrating another alternative embodiment of the circuit 100 is shown. The embodiment of the circuit 100" shown in FIG. 21 generally comprises a pair of the circuits 110 (e.g., 110*a* and 110*b*), a plurality of the circuits 280 (e.g.,

280*a*–280*e*), the circuit 298, the circuit 450, and a pair of circuits 500 (e.g., 500*a* and 500*b*). The circuits 500*a* and 500*b* may be implemented as multiplexer circuits. The embodiment of the circuit 100" shown in FIG. 21 may be implemented as an arbiter circuit having metastable state avoidance using a look-ahead alarm circuit.

The circuit 110*a* may have a first input that may be coupled to an output of the circuit 280*a*, a second input that may be coupled to an output of the circuit 280*c*, an output 120*a* that may present a signal (e.g., GRANTX_Ba) to an input 502*a* of the circuit 500*a*, and an output 122*a* that may present a signal (e.g., GRANTY_Ba) to an input 502*b* of the circuit 500*b*. The circuit 110*b* may have a first input that may be coupled to an output of the circuit 280*d*, a second input that may be coupled to an output of the circuit 280*e*, an output 120*b* that may present a signal (e.g., GRANTX_Bb) to an input 504*a* of the circuit 500*a*, and an output 122*b* that may present a signal (e.g., GRANTY_Bb) to an input 504*b* of the circuit 500*b*.

The circuit 280*a* may have an input that may receive the signal REQX. The circuit 280*b* may have an input that may receive the signal REQY and an output that may be coupled to an input of the circuit 280*c*. The circuit 280*d* may have an input that may receive the signal REQX. The circuit 280*e* may have an input that may receive the signal REQY. The circuit 450 may have an input that may receive the signal REQX.

The circuit 500*a* may have a control input 506*a* that may receive the signal OUT and an output that may present the signal GRANTX_B. The circuit 500*b* may have a control input 506*b* that may receive the signal OUT and an output that may present the signal GRANTY_B. The circuits 500*a* and 500*b* may be implemented as multiplexer circuits. The circuits 500*a* and 500*b* may be configured to present the signals GRANTX_Ba and GRANTY_Ba as the signals GRANTX_B and GRANTY_B, respectively, in response to the signal OUT when the signals REQX and REQY have a close skew (e.g., less than the time $\tau_1$). The circuits 500*a* and 500*b* may be configured to present the signals GRANTX_Bb and GRANTY_Bb as the signals GRANTX_B and GRANTY_B, respectively, in response to the signal OUT when the signals REQX and REQY have a skew greater than the time $\tau_1$.

The embodiment of the circuit 100" shown in FIG. 21 may be configured to present the signals GRANTX_B and GRANTY_B in response to the signals REQX, REQY and OUT, and the delay $\tau_1$. The circuit 100" may be implemented as a pair of phased arbiters (e.g., the circuits 110*a* and 110*b*). The circuit 100" may be configured to (i) detect the likelihood of the circuit 110 entering a metastable state by assessing the phase proximity of the signals REQX and REQY in advance of the circuit 110 switching via the look-ahead circuit 298, (ii) adjust the delay (e.g., the balance point) via the circuit 298, and (iii) select the arbiter circuit 110*a* or 110*b* that is in a non-metastable state to arbitrate the input signals REQX and REQY. The circuit 100" may be implemented having a more narrow aperture window than the circuit 10. The circuit 100" may have improved metastable performance when compared to the circuit 10.

Certain nodes of transistors and other semiconductor devices may be interchanged and still achieve the desired electrical characteristics. The node interchanging may be achieved physically and/or electrically. Examples of transistor nodes that may be interchanged include, but are not limited to, the emitter and collector of bipolar transistors, the drain and source of field effect transistors, and the first base and second base of unijunction transistors.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to arbitrate a plurality of input request signals and present one or more first control signals; and
   a second circuit configured to control said arbitration in response to an adjustable balance point of said input request signals, wherein said balance point is adjusted to reduce a metastable state of said first circuit.

2. The apparatus according to claim 1, wherein (a) said first circuit comprises a cross-coupled NAND gate arbiter, (b) said second circuit comprises (i) one or more delay circuits configured to generate one or more second control signals in response to said input request signals and (ii) one or more latching circuits coupled to said first circuit in response to said one or more second control signals, and (c) said one or more latching circuits are configured to progressively adjust said balance point.

3. The apparatus according to claim 2, wherein said first circuit comprises devices having a high p-channel width to n-channel width ratio and said second circuit comprises devices having a low p-channel width to n-channel width ratio.

4. The apparatus according to claim 1, wherein (a) said first circuit comprises a first cross-coupled NAND gate arbiter, (b) said second circuit comprises (i) one or more delay circuits configured to generate one or more second control signals in response to said input request signals and (ii) one or more second cross-coupled NAND gate arbiters coupled to said first circuit in response to said one or more second control signals, and (c) said one or more second cross-coupled NAND gate arbiters are configured to progressively adjust said balance point.

5. The apparatus according to claim 4, wherein said first circuit comprises devices having a high p-channel width to n-channel width ratio and said second circuit comprises devices having a low p-channel width to n-channel width ratio.

6. The apparatus according to claim 1, wherein (a) said first circuit comprises a first cross-coupled NAND gate arbiter, (b) said second circuit comprises one or more second cross-coupled NAND gate arbiter circuits (i) having a delay circuit serially coupled to an input and (ii) coupled to said first circuit in response to said one or more input request signals, and (c) said one or more second cross-coupled NAND gate arbiter circuits are configured to progressively adjust said balance point.

7. The apparatus according to claim 6, wherein said first circuit comprises devices having a high p-channel width to n-channel width ratio and said second circuit comprises devices having a low p-channel width to n-channel width ratio.

8. The apparatus according to claim 1, wherein (a) said first circuit comprises a jamb latch arbiter, (b) said second circuit comprises (i) one or more delay circuits configured to generate one or more second control signals in response to said input request signals and (ii) one or more contending circuits coupled to said first circuit in response to said one or more second control signals, and (c) said one or more contending circuits are configured to progressively adjust said balance point.

9. The apparatus according to claim 8, wherein said first circuit comprises devices having a high p-channel width to n-channel width ratio and said second circuit comprises devices having a low p-channel width to n-channel width ratio.

10. The apparatus according to claim 8, wherein said contending circuits comprise second jamb latch circuits.

11. The apparatus according to claim 1, wherein (i) said first circuit comprises a cross-coupled NAND gate arbiter having a delay circuit serially coupled to each input of said arbiter and (ii) said second circuit comprises a look-ahead alarm circuit configured to adjust said balance point in response to said one or more input request signals and said one or more first control signals.

12. The apparatus according to claim 1, wherein (i) said first circuit comprises a cross-coupled NAND gate arbiter having a delay circuit serially coupled to each output of said arbiter and (ii) said second circuit comprises a look-ahead alarm circuit configured to adjust said balance point in response to said one or more input request signals.

13. The apparatus according to claim 1, wherein (i) said first circuit comprises a cross-coupled NAND gate arbiter having a delay circuit serially coupled to each input of said arbiter and (ii) said second circuit comprises a look-ahead alarm circuit configured to adjust said balance point in response to said one or more input request signals.

14. The apparatus according to claim 1, wherein (a) said first circuit comprises a cross-coupled NAND gate arbiter having a first delay circuit serially coupled to each input of said arbiter and (b) said second circuit comprises a look-ahead alarm circuit configured to (i) adjust said balance point and (ii) couple a second serial delay circuit into one of said arbiter inputs in response to said one or more input request signals.

15. The apparatus according to claim 1, wherein (a) said first circuit comprises a first cross-coupled NAND gate arbiter having a first delay circuit serially coupled to a first input and a second delay circuit serially coupled to a second input (b) said second circuit comprises a second cross-coupled NAND gate arbiter having said first delay circuit serially coupled to each input and a look-ahead alarm circuit configured to (i) adjust said balance point and (ii) couple said second cross-coupled NAND gate arbiter to said first cross-coupled NAND gate arbiter in response to said one or more input request signals.

16. An apparatus comprising:
means for arbitrating a plurality of input request signals and presenting one or more control signals; and
means for adjusting a balance point of said input request signals to control said arbitration, wherein said balance point is adjusted to reduce a metastable state.

17. A method of prioritizing a resource comprising the steps of:
(A) arbitrating a plurality of input request signals and presenting one or more control signals; and
(B) adjusting a balance point of said input request signals to control said arbitration, wherein said balance point is adjusted to reduce a metastable state.

18. The method according to claim 17, wherein said method further comprises the steps of:
generating one or more second control signals in response to a delay and said input request signals; and
coupling one or more second arbiter circuits to a first arbiter circuit in response to said second control signals.

19. The method according to claim 17, wherein said method further comprises the steps of:
generating one or more second control signals in response to a delay and said input request signals; and
coupling one or more contending circuits to an arbiter circuit in response to said second control signals.

20. The method according to claim 17, wherein said method further comprises the step of:
adjusting said balance point in response to one or more delays and said input request signals with a look-ahead alarm circuit.

* * * * *